United States Patent
Davis et al.

(10) Patent No.: US 12,114,139 B2
(45) Date of Patent: Oct. 8, 2024

(54) WEARABLE AUDIO DEVICE WITH CENTRALIZED STEREO IMAGE AND COMPANION DEVICE DYNAMIC SPEAKER CONTROL

(71) Applicant: Motorola Mobility LLC, Chicago, IL (US)

(72) Inventors: Giles T Davis, Downers Grove, IL (US); Nathan David Alan Tipton, Evanston, IL (US); Michael E Russell, Lake Zurich, IL (US)

(73) Assignee: Motorola Mobility LLC, Chicago, IL (US)

( * ) Notice: Subject to any disclaimer, the term of this patent is extended or adjusted under 35 U.S.C. 154(b) by 237 days.

(21) Appl. No.: 17/843,843

(22) Filed: Jun. 17, 2022

(65) Prior Publication Data
US 2023/0409079 A1  Dec. 21, 2023

(51) Int. Cl.
  *H04R 5/02*   (2006.01)
  *G06F 3/0346*  (2013.01)
  *G06F 3/16*   (2006.01)
  *H04R 3/12*   (2006.01)

(52) U.S. Cl.
  CPC ............. *H04R 5/02* (2013.01); *G06F 3/0346* (2013.01); *G06F 3/165* (2013.01); *H04R 3/12* (2013.01)

(58) Field of Classification Search
None
See application file for complete search history.

(56) References Cited

U.S. PATENT DOCUMENTS

| | | | |
|---|---|---|---|
| 9,794,720 B1 | 10/2017 | Kadri | |
| 10,061,352 B1* | 8/2018 | Trail | G02B 27/0172 |
| 10,514,774 B1 | 12/2019 | Keal | |
| 10,674,268 B2* | 6/2020 | Woelfl | H04R 1/026 |
| 11,029,524 B2* | 6/2021 | Jiang | H04R 1/1091 |
| 11,050,935 B1 | 6/2021 | Gorsica et al. | |
| 11,847,258 B2* | 12/2023 | Myung | G06F 3/013 |
| 2016/0050487 A1* | 2/2016 | Kim | H04R 5/02 |
| | | | 381/74 |

(Continued)

OTHER PUBLICATIONS

"Tune your Sonos speakers with Trueplay", Unknown exact publication date but believed to be prior to filing of present application; Viewed online May 26, 2022 at https://support.sonos.com/s/article/3251?language=en_US.

*Primary Examiner* — Paul W Huber
(74) *Attorney, Agent, or Firm* — Philip H. Burrus, IV

(57) ABSTRACT

A system includes first electronic device in communication with a second electronic device. The first electronic device has one or more motion detectors determining an orientation of the first electronic device in three-dimensional space and a first communication device communicating an indication of the orientation of the first electronic device to the second electronic device. The second electronic device has at least a first audio output and a second audio output delivering audio signals to an environment of the second electronic device. A second communication device receives the indication of the orientation of the first electronic device in the three-dimensional space. One or more processors cause at least one of the first audio output and/or the second audio output to alter the audio signals when the orientation of the first electronic device in the three-dimensional space changes.

19 Claims, 15 Drawing Sheets

(56) References Cited

U.S. PATENT DOCUMENTS

| | | |
|---|---|---|
| 2016/0147266 A1 | 5/2016 | Chng et al. |
| 2017/0153866 A1* | 6/2017 | Grinberg ................. H04S 7/302 |
| 2018/0059778 A1 | 3/2018 | Tyagi et al. |
| 2020/0264006 A1* | 8/2020 | Sommer ................. H04S 1/007 |
| 2022/0357793 A1* | 11/2022 | Hashimoto ............. G06F 3/012 |
| 2023/0396926 A1* | 12/2023 | Ahmed .................... H04R 3/12 |
| 2024/0031716 A1* | 1/2024 | Evans ................. G06F 3/04815 |

* cited by examiner

| DEGREES ROTATION | RMS LEFT | RMS RIGHT | TIME DIFFERENCE (SAMPLES) | TIME DIFFERENCE (SECONDS) |
|---|---|---|---|---|
| 0 | -21.8 | -22.27 | 0 | 0 |
| 10.28 | -22.2 | -22.08 | 0 | 0 |
| 20.57 | -23.19 | -21.50 | 2 | 4.17 E-5 |
| 30.86 | -24.70 | -21.30 | 4 | 8.33 E-5 |
| 41.14 | -26.10 | -20.70 | 6 | 1.25 E-4 |
| 51.43 | -27.68 | -19.70 | 8 | 1.67 E-4 |

WEARABLE AUDIO DEVICE WITH CENTRALIZED STEREO IMAGE AND COMPANION DEVICE DYNAMIC SPEAKER CONTROL

BACKGROUND

Technical Field

This disclosure relates generally to wearable electronic devices, and more particularly to wearable electronic devices with audio outputs.

Background Art

Wearable audio devices come in many forms, but the primary two include headphones and earbuds. While both work well to deliver high fidelity audio in practice, some users prefer not to have something occluding or covering their ears for long periods of time. This can be especially true of gamers and other people who use augmented reality (AR) or virtual reality (VR) devices to engage in VR/AR environments. While some VR/AR devices include integrated speakers, these speakers are frequently small, lacking in power, and unable to produce high fidelity sounds. Moreover, some VR/AR devices do not include speakers at all. For a person who wants to leave their ears open to the environment, external speakers can be used. However, when the person turns their head the audio loudness spectrum may noticeably change, thereby taking them "out" of their VR/AR experience and distracting them from the VR/AR environment. It would be advantageous to have an improved audio system that minimizes or eliminates this change in the audio loudness spectrum.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present disclosure.

Figure 1:
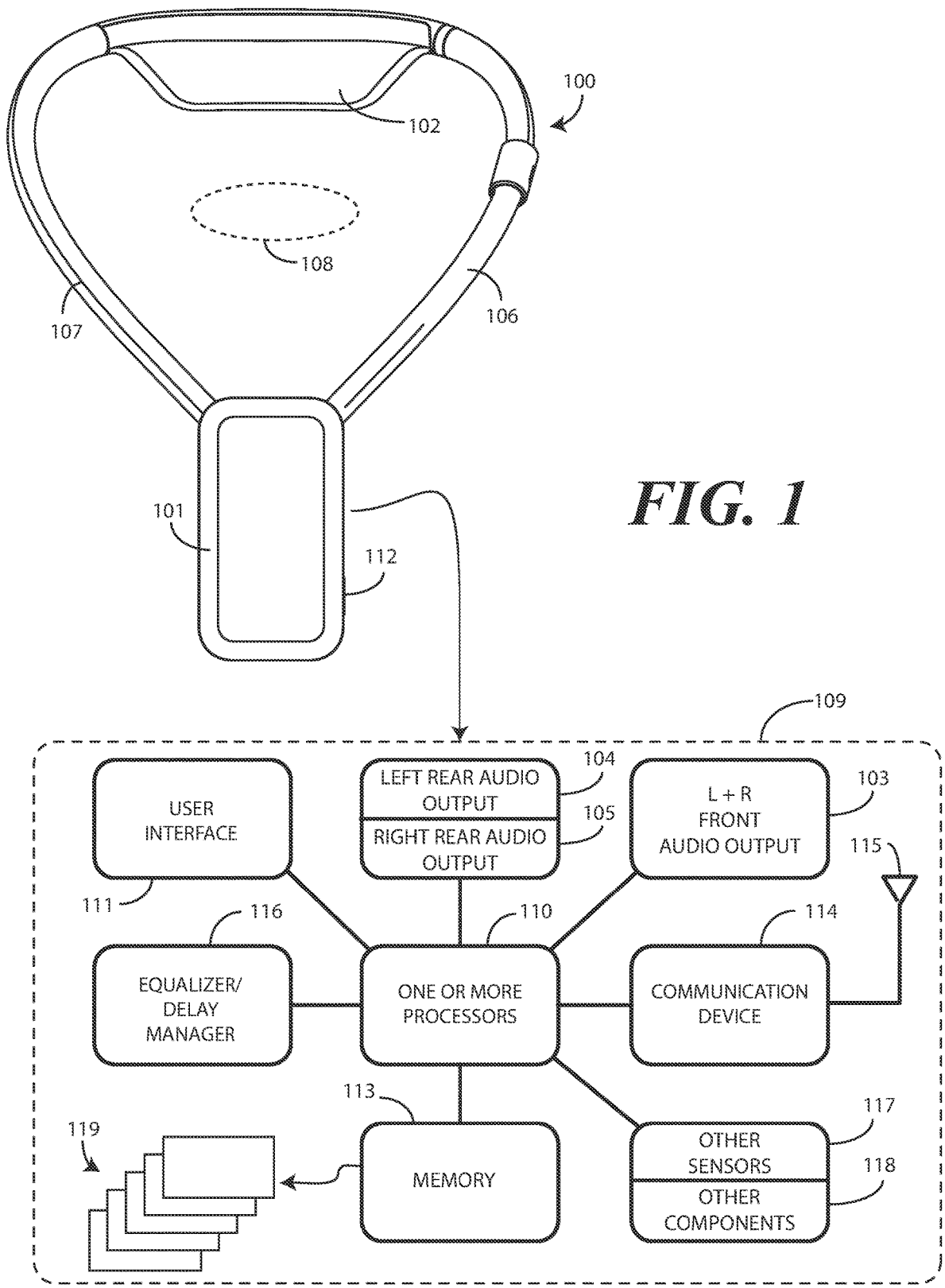
FIG. 1 illustrates one explanatory wearable electronic device in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Before describing in detail embodiments that are in accordance with the present disclosure, it should be observed that the embodiments reside primarily in combinations of method steps and apparatus components related to compensating the audio output of a wearable electronic device when a user's head moves, as detected from orientation signals of a companion electronic device being worn on the user's head, that includes causing at least one of a first audio output and/or a second audio output to alter audio signals by making them louder or softer when the orientation of the companion electronic device in three-dimensional space changes. Any process descriptions or blocks in flow charts should be understood as representing modules, segments, or portions of code which include one or more executable instructions for implementing specific logical functions or steps in the process.

Alternate implementations are included, and it will be clear that functions may be executed out of order from that shown or discussed, including substantially concurrently or in reverse order, depending on the functionality involved. Accordingly, the apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

Embodiments of the disclosure do not recite the implementation of any commonplace business method aimed at processing business information, nor do they apply a known business process to the particular technological environment of the Internet. Moreover, embodiments of the disclosure do not create or alter contractual relations using generic computer functions and conventional network operations. Quite to the contrary, embodiments of the disclosure employ methods that, when applied to electronic device and/or user interface technology, improve the functioning of the electronic device itself by and improving the overall user experience to overcome problems specifically arising in the realm of the technology associated with electronic device user interaction.

It will be appreciated that embodiments of the disclosure described herein may be comprised of one or more conventional processors and unique stored program instructions that control the one or more processors to implement, in conjunction with certain non-processor circuits, some, most, or all of the functions of increasing a first sound volume associated with first audio emanating from a first audio port when an orientation of a companion electronic device rotates in a first direction relative to a wearable electronic device having the first audio port, and increasing a second sound volume associated with second audio emanating from a second audio port when the orientation of the companion electronic device rotates in a second direction relative to the wearable electronic device that is opposite the first direction. The non-processor circuits may include, but are not limited to, a radio receiver, a radio transmitter, signal drivers, clock circuits, power source circuits, and user input devices. As such, these functions may be interpreted as steps of a method to increasing a sound volume from a sound audio port in accordance with the methods and systems described below.

Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ASICs with minimal experimentation.

Embodiments of the disclosure are now described in detail. Referring to the drawings, like numbers indicate like parts throughout the views. As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions.

As used herein, components may be "operatively coupled" when information can be sent between such components, even though there may be one or more intermediate or intervening components between, or along the connection path. The terms "substantially," "essentially," "approximately," "about," or any other version thereof, are defined as being close to as understood by one of ordinary skill in the art, and in one non-limiting embodiment the term is defined to be within ten percent, in another embodiment within five percent, in another embodiment within one percent and in another embodiment within one-half percent. The term "coupled" as used herein is defined as connected, although not necessarily directly and not necessarily mechanically. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide a wearable electronic device that is sleek, slim, and stylish. In one or more embodiments, the wearable electronic device includes an anterior pendant and a posterior pendant that are connected by two minimalist neck straps. Embodiments of the disclosure contemplate that it is not always practical—especially when trying to design a stylish and fashionable electronic device—to place the loudspeakers beneath the ears of a wearer. While speakers placed behind the ears can provide adequate sound quality and stereo image, this alone is suboptimal due to the fact that the stereo image sounds like it is behind the user. People like to listen to immersive music or music that they can see. They typically do not prefer to listen to posterior music sources.

Similarly, placing stereo audio output devices in front of a wearer generally fails to provide a robust stereo image, as noted above. This is due to the fact that there is not enough physical separation between the audio output devices relative to the ears to separate the left and right channels.

Advantageously, embodiments of the disclosure position a single loudspeaker in an anterior pendant that provides a monaural audio signal output combining a left channel audio signal output and a right channel audio signal output, positioning an anterior pendant that delivers a left channel audio signal output and a right channel audio signal output. This arrangement of audio ports "pulls" the combined stereo image from the posterior pendant toward the anterior pendant to a central location within the wearable electronic device situated at locations corresponding to a wearer's ears. The use of an anterior pendant to deliver a combined left and right channel audio output, while using a posterior pendant to deliver separate left and right channel audio, is preferred by users as the stereo image defined by the combination of these three outputs provides a rich, enveloping stereo image that sounds as if located right at the user's ears.

While this rich, enveloping stereo image is amazing when the user's ears are centered within a centralized location within the wearable electronic device, embodiments of the disclosure contemplate that the perception of this rich, enveloping stereo image can change when the person turns their head to the left or right. This occurs because one ear may get closer to a first audio port, for example, while the other ear gets farther from a second audio port. This motion can cause the audio loudness spectrum to noticeably change. When the wearable electronic device is being used as an audio device for a companion VR/AR device, this change from the rich, enveloping stereo image to an ordinary stereo image may distract a person from the VR/AR environment and take them "out of" their experience. What's more, as a person rotates their head the time of arrival of each audio signal may shift, thereby taking them farther away from that rich, enveloping sound they enjoyed while their ears were in the centralized location within the wearable electronic device.

Embodiments of the disclosure advantageously provide a solution to this problem by receiving signals from one or more motion detectors positioned in a companion electronic device worn on a person's head, one example of which is an VR/AR device configured as VR/AR glasses. Using signals from the one or more motion detectors of the companion electronic device, one or more processors in the wearable audio device can determine an angle of rotation from center (when the user is facing straight ahead) and can use this information to determine the orientation of the person's head relative to the anterior pendant and posterior pendant of the wearable audio device.

Illustrating by example, when a person first dons the VR/AR device, in one or more embodiments that person is asked to position virtual elements in an VR/AR environment so that these virtual elements can be located as the person looks around in the VR/AR environment. During this setup process, one or more processors of the wearable audio electronic device can calibrate signals both from motion detectors situated in the wearable audio electronic device and signals received at the wearable audio electronic device from the VR/AR device by asking the person to look straight ahead, optionally at a selected virtual element in the VR/AR environment.

Once this initial calibration is completed, one or more processors of the wearable audio electronic device can begin monitoring changes in signals situated in the wearable audio electronic device and in the signals from the motion detectors of the VR/AR device. When these signals indicate that the orientation of the VR/AR device relative to the wearable audio electronic device have changed in three-dimensional space, this serves as a proxy that the orientation of the person's head has changed in three-dimensional space due to the fact that the VR/AR device is being worn on the head and the wearable audio electronic device is being worn around the neck. Accordingly, one or more processors of the wearable audio electronic device can adjust speaker output settings accordingly so as to minimize or eliminate any changes in the audio loudness spectrum when the person turns their head.

This adjustment of the speaker output settings can occur in predefined stepped stages, such as every time the person moves their head by more than ten degrees in one or more embodiments. Additionally, changes can be made to multiple speakers. For instance, when a user turns to the left, the mid-range of the audible spectrum (presumed to be 20 Hz to 20 kHz in this disclosure) emanating from the speaker closer to the right ear can be amplified while the low-end of the audible spectrum emanating from the speaker closer to the left ear may be reduced. Other techniques for adjusting speaker output settings will be described below. Still others will be obvious to those of ordinary skill in the art having the benefit of this disclosure.

In one or more embodiments, a first electronic device is electronically in communication with a second electronic device. One explanatory embodiment used below to illustration the operation and benefits of embodiments of the disclosure uses a VR/AR device as the first electronic device and a wearable audio electronic device as the second electronic device. However, embodiments of the disclosure are not so limited. The first electronic device could be a head mounted fitness monitor while the second electronic device is the wearable audio electronic device. Similarly, the first electronic device may just be a pair of ordinary glasses with one or more motion detectors and a communication device incorporated therein. Other configurations will be obvious to those of ordinary skill in the art having the benefit of this disclosure.

In one or more embodiments, the first electronic device comprises one or more motion detectors determining an orientation of the first electronic device in three-dimensional space. The first electronic device includes a first communication device communicating an indication of the orientation of the first electronic device in three-dimensional space to the second electronic device.

In one or more embodiments, the second electronic device comprises at least a first audio output and a second audio output delivering audio signals to an environment of the electronic device. In one or more embodiments, the audio signals span a spectrum of 20 Hertz to 20 kHz. In one or more embodiments, the second electronic device also comprises a second communication device receiving the indication of the orientation of the first electronic device in the three-dimensional space from the first electronic device.

In one or more embodiments, the second electronic device comprises one or more processors. The one or more processors cause at least one of the first audio output and/or the second audio output to alter the audio signals when the orientation of the first electronic device in the three-dimensional space changes. For instance, the one or more processors may cause the at least some of the audio signals emanating from a first audio port of a posterior pendant to increase in volume, while causing at least some of the audio signals emanating from a second audio port of the posterior pendant to decrease in volume. Additionally, one or more time delays may be inserted to ensure that audio signals emanating from the first audio port and second audio port reach the user's ears at the same time. Other adjustments will be obvious to those of ordinary skill in the art having the benefit of this disclosure.

In one or more embodiments, a method in an electronic device comprises receiving signals from a companion electronic device indicating an orientation of the companion electronic device relative to the electronic device. In one or more embodiments, the electronic device and the companion electronic device are physically separate electronic devices.

In one or more embodiments, the method comprises increasing a first sound volume associated with first audio emanating from a first audio port when the orientation of the companion electronic device rotates in a first direction relative to the electronic device. In one or more embodiments, the method comprises increasing a second sound volume associated with second audio emanating from a second audio port when the companion electronic device rotates in a second direction that is opposite the first direction.

In one or more embodiments, the wearable audio electronic device comprises an anterior pendant, a posterior pendant, a left shoulder strap coupling left sides of the anterior pendant and the posterior pendant together and a right shoulder strap coupling right sides of the anterior pendant and the posterior pendant together. In one or more embodiments, the wearable audio electronic device comprises a plurality of audio outputs consisting of a left channel audio signal output situated at a first end of the posterior pendant, a right channel audio signal output situated at a second end of the posterior pendant separated from the first end by a posterior pendant body, and a single combined left channel and right channel audio signal output situated at a cranial edge of the anterior pendant.

A communication device receives signals from a companion electronic device indicating an orientation of the companion electronic device relative to the wearable audio electronic device. In one or more embodiments, one or more processors cause the left channel audio signals emanating from the left channel audio signal output to increase in volume when the signals from the companion electronic device indicate the orientation of the companion electronic device rotates in a first direction. By contrast, the one or more processors cause the right channel audio signals emanating from the right channel audio signal output.

While the entire audible spectrum (20 Hertz to 20 kHz) emanating from the left channel audio signal output or the right channel audio signal output could be adjusted as a function of the orientation of the companion electronic device, in one or more embodiments to save processing and battery power only a portion of the audio spectrum is manipulated when the companion electronic device moves relative to the wearable audio electronic device. Experimental testing has shown that the audio loudness spectrum changes the most above one kilohertz for the ear moving away an audio port, and changes most below five kilohertz for the ear moving toward an audio port. Thus, when an ear moves away from a speaker, it "sounds" like frequencies between one and ten kilohertz get quieter, while it sounds like the low end, e.g., frequencies less than five kilohertz, get louder when an ear moves toward a speaker. Accordingly, in one or more embodiments the one or more processors of the wearable audio electronic device adjust only a portion of the audio spectrum rather than the entire audio spectrum. Thus, while the full audio spectrum emanates from a speaker, if an ear moves away from it a portion of that spectrum will be increased in volume. When an ear moves toward a speaker emanating the full audio spectrum, a portion of that spectrum can be decreased in volume as well.

Illustrating by example, in one or more embodiments one or more processors of the wearable audio electronic device cause a first audio output and/or second audio output to alter audio signals by increasing a first volume of at least a portion of a first audio signal emanating from a first audio output when the orientation of the companion electronic device changes in a first direction. This may include increasing the volume of audio signals having frequencies greater than one kilohertz. Consequently, when the full audio spectrum emanates from the speaker, the portions thereof having frequencies above one kilohertz will be louder while those having frequencies under one kilohertz are unaltered.

Similarly, the one or more processors can cause the first audio output and/or second audio output to alter the audio signals by decreasing a volume of at least a portion of a second audio signal emanating from a second audio output when the orientation of the companion electronic device changes in the first direction. This may include decreasing the volume of audio signals having frequencies less than one kilohertz. Consequently, when the full audio spectrum emanates from the speaker, the portions thereof having frequencies below five kilohertz will be quieter while those having frequencies above five kilohertz are unaltered. This volume adjustment to only a "portion" of the spectrum, while always allowing the full spectrum to emanate from the speakers, will be explained in greater detail with reference to FIGS. 8-10 and 14 below.

While many prior art devices frequently include motion detectors, embodiments of the disclosure are different in that embodiments of the disclosure determine a deviation between motion detectors on two physically separate and uncoupled pieces of hardware. Thus, while a laptop may be able to detect where the display and keyboard portions are positioned using motion detectors, those portions are physically coupled together. By contrast, embodiments of the disclosure described below use two physically uncoupled pieces of hardware, examples of which include a VR/AR device and a wearable audio electronic device, to adjust the audio performance of the wearable audio electronic device. Thus, in one or more embodiments motion detectors in a first electronic device communication positional status to a second electronic device. One or more processors in the second electronic device then update the audio spectrum and/or loudness level accordingly.

Turning now to FIG. 1, illustrated therein is one explanatory wearable electronic device 100 configured in accordance with one or more embodiments of the disclosure. In one or more embodiments, the wearable electronic device 100 comprises an anterior pendant 101 and a posterior pendant 102. In one or more embodiments, the anterior pendant 101 comprises a single channel anterior audio output 103 delivering a combined left channel audio signal and right channel audio signal through a port of the anterior pendant 101. The posterior pendant 102 comprises a first single channel posterior audio output 104 delivering the left channel audio signal through a first port of the posterior pendant 102 and a second single channel posterior audio output 105 delivering the right channel audio signal through a second port of the posterior pendant 102. The combination of the combined left channel audio signal and right channel audio signal from the anterior pendant 101 and the separated left channel audio signal and right channel audio signal from the posterior pendant 102 pull a perceived stereo image 108 toward the anterior pendant 101 to a centralized location within the wearable electronic device 100.

In one or more embodiments, a first neck strap 106 couples a first side of the anterior pendant 101 to a first side of the posterior pendant 102. In one or more embodiments, a second neck strap 107 couples a second side of the anterior pendant 101 to a second side of the posterior pendant 102.

In one or more embodiments, each of the anterior pendant 101 and the posterior pendant 102 includes a housing, while the first neck strap 106 and the second neck strap 107 serve both as a right shoulder strap and left shoulder strap that allow the wearable electronic device 100 to be worn around the neck as well as to provide a conduit for electrical connections passing from the anterior pendant 101 to the posterior pendant 102 or vice versa. While the anterior pendant 101 and posterior pendant 102 can be configured as shown in FIG. 1, other configurations for each housing and/or shoulder strap and/or other mechanical configurations of wearable electronic devices will be obvious to those of ordinary skill in the art having the benefit of this disclosure.

Also illustrated in FIG. 1 is one explanatory block diagram schematic 109 of the wearable electronic device 100. In one or more embodiments, the block diagram schematic 109 can be constructed as multiple printed circuit board assemblies situated within either the housing of the anterior pendant 101, the housing of the posterior pendant 102, the first neck strap 106, the second neck strap 107, or combinations thereof. While this is one embodiment, in another embodiment the electrical connections between the anterior pendant 101 and the posterior pendant 102 are wireless. Where one or more circuit boards are used, the various components can be electrically coupled together by conductors or a bus disposed along one or more printed circuit boards, or alternatively by one or more wireless electronic communication circuits. It should be noted that the block diagram schematic 109 includes many components that are optional, but which are included in an effort to demonstrate how varied electronic devices configured in accordance with embodiments of the disclosure can be.

Illustrating by example, in one or more embodiments the wearable electronic device 100 includes a user interface 111. The user interface 111 can include an audio input device, such as a microphone, to receive audio input. The user interface 111 also includes a plurality of audio output devices to deliver audio output, which in this illustrative embodiment include the single channel anterior audio output 103 of the anterior pendant 101 and the first single channel posterior audio output 104 of the posterior pendant 102 and the second single channel posterior audio output 105 of the posterior pendant 102. Each of the single channel anterior audio output 103 of the anterior pendant 101, the first single channel posterior audio output 104 of the posterior pendant 102, and the second single channel posterior audio output 105 of the posterior pendant 102 can consist of a single loudspeaker in one or more embodiments. However, in other embodiments, multiple loudspeakers can be clustered to form each of the single channel anterior audio output 103 of the anterior pendant 101, the first single channel posterior audio output 104 of the posterior pendant 102, and the second single channel posterior audio output 105 of the posterior pendant 102 as well.

In one or more embodiments, the user interface 111 includes a display, which can optionally be configured to be touch sensitive. Where the wearable electronic device 100 is configured to be a companion electronic device to another electronic device, such as a smartphone, with its companion functionality being that of purely an audio output device, a display would be optional, in it is not required for this aural user interaction convention.

Thus, it is to be understood that the block diagram schematic 109 of FIG. 1 is provided for illustrative purposes only and for illustrating components of one wearable electronic device 100 in accordance with embodiments of the disclosure. The block diagram schematic 109 of FIG. 1 is not intended to be a complete schematic diagram of the various components required for a wearable electronic device 100. Therefore, other electronic devices in accordance with embodiments of the disclosure may include various other components not shown in FIG. 1 or may include a combination of two or more components or a division of a particular component into two or more separate components, and still be within the scope of the present disclosure.

The illustrative block diagram schematic 109 of FIG. 1 includes many different components. Embodiments of the disclosure contemplate that the number and arrangement of such components can change depending on the particular application. For example, a wearable electronic device that only includes at least one audio output with no audio input may have fewer, or different, components from a wearable electronic device having both user interface components. Similarly, a wearable electronic device that includes at least one audio output in addition to at least one audio input can include multiple audio inputs, one example of which would be a microphone array. Accordingly, electronic devices configured in accordance with embodiments of the disclosure can include some components that are not shown in FIG. 1, and other components that are shown may not be needed and can therefore be omitted.

As noted above, the user interface 111 can include a display, which may optionally be touch sensitive. In one embodiment, users can deliver user input to the display of such an embodiment by delivering touch input from a finger, stylus, or other objects disposed proximately with the display. In one embodiment, the display is configured as an active-matrix organic light emitting diode (AMOLED) display. However, it should be noted that other types of displays, including liquid crystal displays, suitable for use with the user interface would be obvious to those of ordinary skill in the art having the benefit of this disclosure. Where a display is omitted, a user interface component 112, such as a button, switch, touch sensitive surface, or other control mechanism can allow a user to operate the wearable electronic device 100.

In one embodiment, the wearable electronic device 100 includes one or more processors 110. In one embodiment, the one or more processors 110 can include an application processor and, optionally, one or more auxiliary processors. One or both of the application processor and/or the auxiliary processor(s) can include one or more processors. One or both of the application processor and/or the auxiliary processor(s) can be a microprocessor, a group of processing components, one or more ASICs, programmable logic, or other type of processing device.

The application processor and/or the auxiliary processor(s) can be operable with the various components of the block diagram schematic 109. Each of the application processor and/or the auxiliary processor(s) can be configured to process and execute executable software code to perform the various functions of the wearable electronic device 100 with which the block diagram schematic 109 operates. A storage device, such as memory 113, can optionally store the executable software code used by the one or more processors 110 during operation.

In this illustrative embodiment, the block diagram schematic 109 also includes a communication circuit 114 that can be configured for wired or wireless communication with one or more other devices or networks. The networks can include a wide area network, a local area network, and/or personal area network. The communication circuit 114 may also utilize wireless technology for communication, such as, but are not limited to, peer-to-peer or ad hoc communications such as HomeRF, Bluetooth and IEEE 802.11-based communications, as well as other forms of wireless communication such as infrared technology. The communication circuit 114 can include wireless communication circuitry, one of a receiver, a transmitter, or transceiver, and one or more antennas 115.

In one embodiment, the one or more processors 110 can be responsible for performing the primary functions of the electronic device with which the block diagram schematic 109 is operational. For example, in one embodiment the one or more processors 110 comprise one or more circuits operable with the user interface 111 to deliver audio output signals in the form of acoustic waves to a user. The source data for generating these acoustic waves could be stored in the memory 113, or alternatively may be received from an external electronic device using the communication circuit 114. The one or more processors 110 can be operable with audio output devices to deliver audio output to a user. The executable software code used by the one or more processors 110 can be configured as one or more modules 119 that are operable with the one or more processors 110. Such modules 119 can store instructions, control algorithms, media content, digital to analog conversion algorithms, sound generation algorithms, and so forth.

In one or more embodiments, the one or more processors 110 operate with, or as, an audio input/processor. The audio input/processor is operable to receive audio input from a source, such as a person, authorized user, plurality of persons within an environment about the wearable electronic device 100, from the environment about the wearable electronic device 100, or combinations thereof. The audio input/processor can include hardware, executable code, and speech monitor executable code in one embodiment. The audio input/processor can be operable with one or both of an audio input device, such as one or more microphones, and/or the audio output devices, each of which can comprise one, or more than one, loudspeaker as previously described.

In one embodiment, the audio input/processor is configured to implement a voice control feature that allows the wearable electronic device 100 to function as a voice assistant device, which is a digital assistant using voice recognition, speech synthesis, and natural language processing to receive audio input comprising a voice command from a source, determine the appropriate response to the voice command, and then deliver the response in the form of audio output in response to receiving the audio input from the source.

Various sensors 117 can be operable with the one or more processors 110. A first example of a sensor that can be included with the various sensors 117 is a touch sensor. The touch sensor can include a capacitive touch sensor, an infrared touch sensor, resistive touch sensors, or another touch-sensitive technology that serves as a user interface 111 for the wearable electronic device 100.

Another example of a sensor 117 is a geo-locator that serves as a location detector. Location of the wearable electronic device 100 can be determined by capturing the location data from a constellation of one or more earth orbiting satellites, or from a network of terrestrial base stations to determine an approximate location.

The various sensors 117 can include one or more motion detectors configured as an orientation detector that determines an orientation and/or movement of the wearable electronic device 100 in three-dimensional space. Illustrating by example, the orientation detector can include an accelerometer, a multi-axis accelerometer, gyroscopes, or other device to detect device orientation and/or motion of the wearable electronic device 100. Other sensors 117 suitable for inclusion with the wearable electronic device 100 will be obvious to those of ordinary skill in the art having the benefit of this disclosure.

Other components 118 operable with the one or more processors 110 can include output components such as video, audio, and/or mechanical outputs. For example, the output components may include a video output component or auxiliary devices including a cathode ray tube, liquid crystal display, plasma display, incandescent light, fluorescent light, front or rear projection display, and light emitting diode indicator. Other examples of output components include audio output components such as the one or more loudspeakers used for the single channel anterior audio output 103 of the anterior pendant 101, the first single channel posterior audio output 104 of the posterior pendant 102, and the second single channel posterior audio output 105 of the posterior pendant 102, or other alarms and/or buzzers. The other components 118 can also include a mechanical output component such as vibrating or motion-based mechanisms.

In one or more embodiments, the one or more processors 110 can define one or more process engines. One example of such a process engine is the equalizer/delay manager 116. In one or more embodiments, the equalizer/delay manager 116 is operable to insert a predefined delay between the combined left channel audio signal and right channel audio signal emanating from the single channel anterior audio output 103 of the anterior pendant 101 and each of the left channel audio signal emanating from the first single channel posterior audio output 104 of the posterior pendant 102 and the right channel audio signal emanating from second single channel posterior audio output 105 of the posterior pendant.

This predefined delay ensures that audio signals from the posterior pendant 102, which are closer to the user's ears, arrive at the user's ears at the same time or after as those from the anterior pendant 101, which is farther away. In one or more embodiments, the equalizer/delay manager 116 can also adjust the relative volume levels of sound emanating the combined left channel audio signal and right channel audio signal emanating from the single channel anterior audio output 103 of the anterior pendant 101 and each of the left channel audio signal emanating from the first single channel posterior audio output 104 of the posterior pendant 102 and the right channel audio signal emanating from second single channel posterior audio output 105 of the posterior pendant to affect the overall user experience as well.

Figure 4:
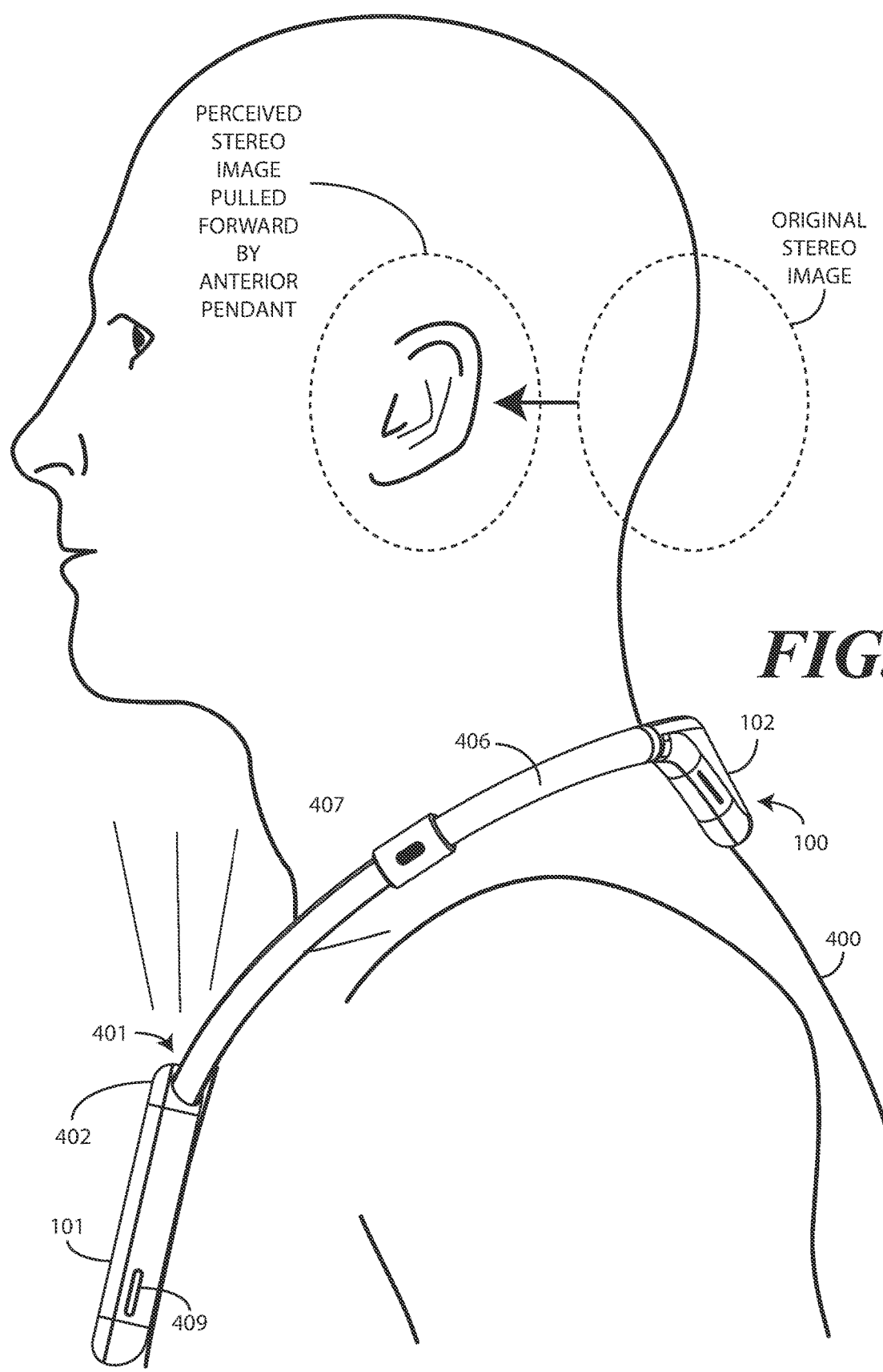
FIG. 4 illustrates a side elevation view of a user wearing one explanatory wearable electronic device in accordance with one or more embodiments of the disclosure.
Figure 5:
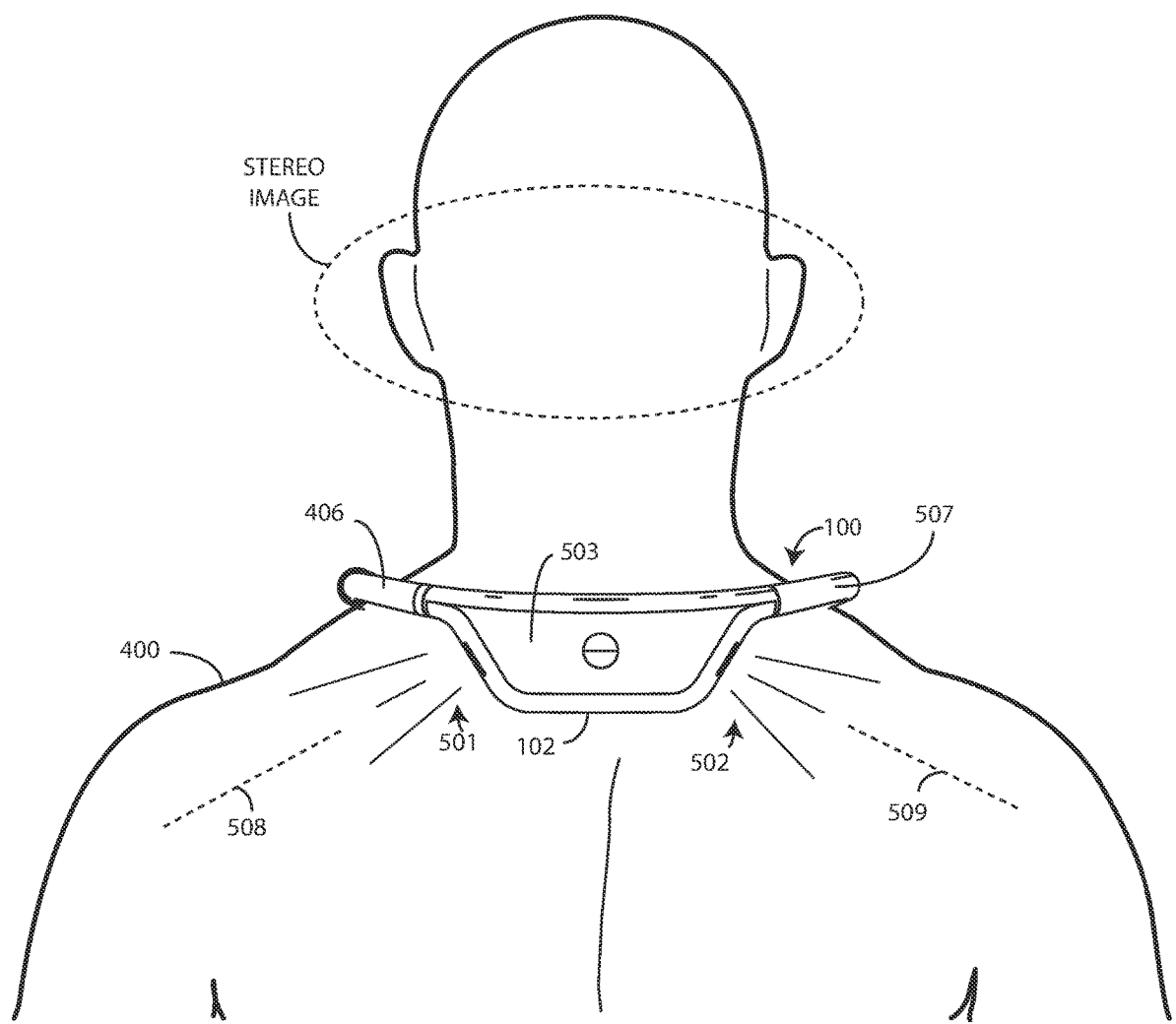
FIG. 5 illustrates a rear elevation view of the user wearing one explanatory wearable electronic device in accordance with one or more embodiments of the disclosure.

In one or more embodiments, the predefined delay is less than three milliseconds. In one or more embodiments, the predefined delay is about one millisecond. These examples are based upon the speed of sound when the wearable electronic device 100 is worn as shown in FIGS. 4 and 5 below, with the anterior pendant 101 and posterior pendant 102 positioned in the corresponding relationship to the user's ears.

In one or more embodiments, the predefined delay is user definable. Illustrating by example, in one or more embodiments a user can use the user interface 111 to define the predefined delay to adjust the location of the stereo image 108 within the perimeter of the wearable electronic device 100. Illustrating by example, embodiments of the disclosure contemplate that a user may want to adjust the stereo image 108 such that it situates slightly in front of the ears, at the ears, or slightly behind the ears. By making the predefined delay and/or relative volume level user adjustable, any of these locations becomes possible.

Each process engine can be a component of the one or more processors 110, operable with the one or more processors 110, defined by the one or more processors 110, and/or integrated into the one or more processors 110. Other configurations for these process engines, including as software or firmware modules operable on the one or more processors 110, will be obvious to those of ordinary skill in the art having the benefit of this disclosure.

Figure 2:
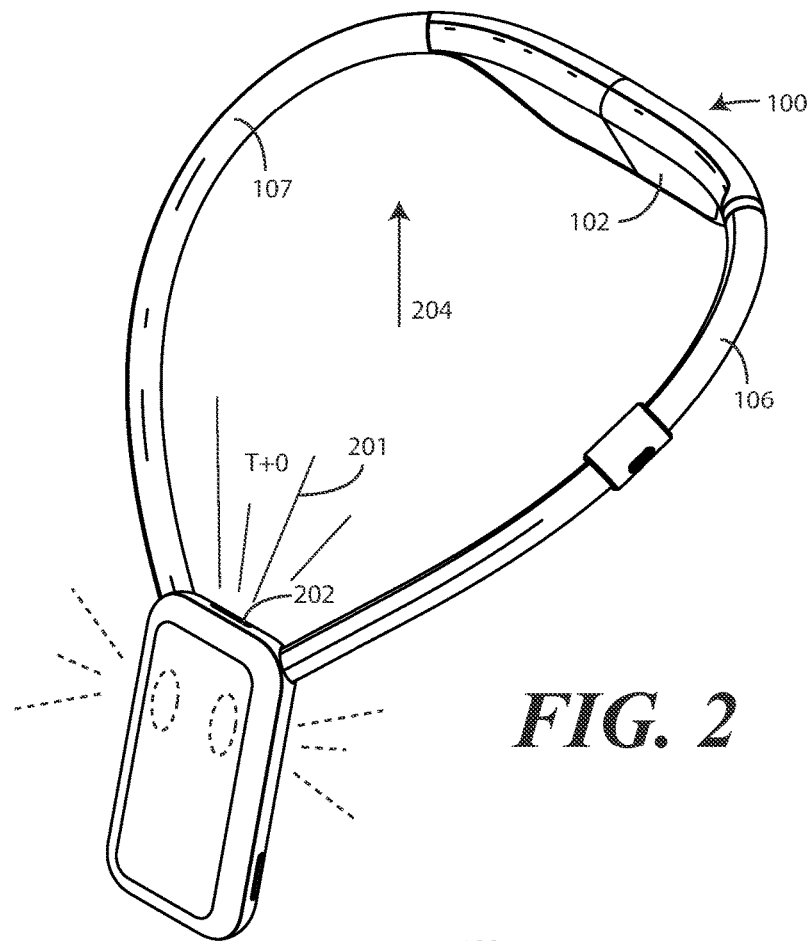
FIG. 2 illustrates a perspective view of one explanatory wearable electronic device in accordance with one or more embodiments of the disclosure.
Figure 3:
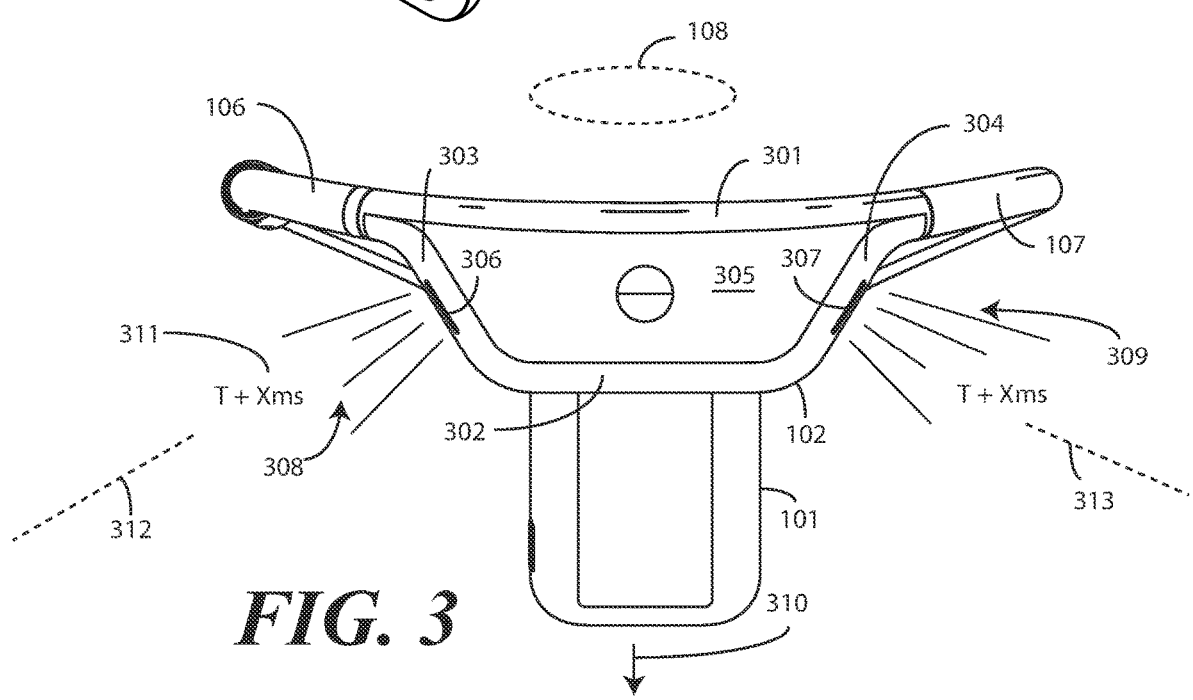
FIG. 3 illustrates a rear elevation view of one explanatory wearable electronic device in accordance with one or more embodiments of the disclosure.

Now that various hardware components of the wearable electronic device 100 have been described, a discussion of the operation of the wearable electronic device 100 is in order. Turning now to FIGS. 2-3, illustrated therein is the explanatory electronic device 100 of FIG. 1 delivering audio output signals that combine to move the stereo image from a location closer to the posterior pendant 102 to one farther from the posterior pendant 102, closer to the anterior pendant 101, with its center situated vertically within a columnar boundary defined by the anterior pendant 101, the posterior pendant 102, the first neck strap 106, and the second neck strap 107.

As shown in FIG. 2, the single channel anterior audio output (103) of the anterior pendant 101 delivers a combined left channel audio signal and right channel audio signal output 201 through a port 202 of the anterior pendant 101. In this illustrative embodiment, the port 202 of the anterior pendant 101 is situated along an upper edge 301 of the anterior pendant 101. This results in the combined left channel audio signal and right channel audio signal output 201 being directed toward a cranial side 204 of the wearable electronic device 100.

As shown in FIG. 3, the posterior pendant 102 comprises an upper edge 301, a lower edge 302, a first side edge 303, and a second side edge 304. In one or more embodiments, the first side edge 303 and the second side edge 304 taper inward as they extend from the upper edge 301 to the lower edge 302. In so doing, the upper edge 301, which defines a first end of the posterior pendant 102, the lower edge 302, which defines a base of the posterior pendant 102, define a caudally facing (when the wearable electronic device 100 is worn as shown in FIGS. 3-4 below) frustoconical posterior pendant major surface 305.

As used herein, "frustoconical" takes its ordinary meaning of the shape of a frustum or cone with its pointed end cut off by a plane running substantially parallel to its base. In this vein, the caudally facing frustoconical posterior pendant major surface is wider at the top than at the bottom with the upper edge 301 being oriented substantially parallel with the lower edge 302, and with the first side edge 303 and second side edge 304 tapering inward as they extend downward (caudally) from the upper edge 301.

In one or more embodiments, the first port 306 of the posterior pendant 102 is situated on the first side edge 303, while the second port 307 of the posterior pendant 102 is situated on the second side edge 304. This arrangement, counterintuitively, causes the left channel audio signal output 308 and the right channel audio signal output 309 to be directed downward, i.e., toward a caudal side 310 of the wearable electronic device 100 and away from each other.

This orientation results in central axes 312,313 of the first port 306 of the posterior pendant 102 and the second port 307 of the posterior pendant 102, which pass from an interior of the posterior pendant 102 to an exterior of the posterior pendant 102, extending downward from the upper edge 301 of the posterior pendant 102 and away from each other. Thus, the left channel audio signal output 308 is delivered downward and away from both the posterior pendant 102 and the right channel audio signal output 309, while the right channel audio signal output 309 is delivered downward and away from both the posterior pendant 102 and the left channel audio signal output 308.

Delivering the left channel audio signal output 308 and right channel audio signal output 309 downward and away from the posterior pendant 102 at roughly forty-five degree angles maximizes the aural separation of each channel, thereby improving the robustness and richness of the stereo image 108 resulting from the combination of the combined left channel audio signal output and right channel audio signal output 201 from the port 202 in the anterior pendant 101 and the left channel audio signal output 308 and the right channel audio signal output 309 from the first port 306 and second port 307 of the posterior pendant 102.

As shown in FIGS. 2-3, with more clarity shown below in FIGS. 4-5, in one or more embodiments when the wearable electronic device 100 is worn the anterior pendant 101 is farther from the user's ears than is the posterior pendant 102. Consequently, the port 202 of the anterior pendant 101 is farther from the user's ears than either the first port 306 of the posterior pendant 102 or the second port 307 of the posterior pendant 102. Accordingly, it takes more time for the the combined left channel audio signal and right channel audio signal output 201 to reach the user's ears than either the left channel audio signal output 308 or right channel audio signal output 309.

To compensate, in one or more embodiments one or more processors (110) of the wearable electronic device 100 insert a predefined delay 311 between the combined left channel audio signal and right channel audio signal output 201 emanating from the single channel anterior audio output (103) and each of the left channel audio signal output 308 and right channel audio signal output 309 emanating from the first single channel posterior audio output (104) and the second single channel posterior audio output (105), respectively. Since sound travels at 1100 feet per second in air at room temperature, which is roughly one millisecond per foot, in one or more embodiments the predefined delay 311 is about one millisecond. In another embodiment, testing has shown that a predefined delay 311 of about 0.25 milliseconds works well. Embodiments of the disclosure contemplate that delays over three milliseconds will affect the desirability of the stereo image 108. Accordingly, in one or more embodiments the predefined delay 311 is between zero and three milliseconds. As previously described, the predefined delay 311 can be user definable in one or more embodiments.

Turning now to FIGS. 4 and 5, illustrated therein is a user 400 wearing a wearable electronic device 100 configured in one or more embodiments of the disclosure. As previously described, the wearable electronic device 100 includes an anterior pendant 101 and a posterior pendant 102. In this illustrative embodiment the anterior pendant 101 is generally rectangular in shape and situates at the anterior portion of the user's torso by sitting flush against the user's chest with the first port (202) of the anterior pendant 101 situating beneath the user's chin in front of the user's ears. The posterior pendant 102 takes the shape of an inverted frustoconical quadrilateral and situates on the posterior portion of the user's torso by sitting flush against the user's shoulders behind the neck and behind the user's ears.

A right shoulder strap 507 passes across the user's right shoulder and couples the right sides of the anterior pendant 101 and the posterior pendant 102 together. Likewise, a left shoulder strap 406 passes across the user's left shoulder and couples the left sides of the anterior pendant 101 and the posterior pendant 102 together. In this illustrative embodiment, each of the right shoulder strap 507 and the left shoulder strap 406 are circular in cross section and exit from the top of the posterior pendant 102 as extensions from the widest edge of the inverted frustoconical quadrilateral and then enter the upper corners of the rectangle defining the anterior pendant 101. An optional decoupling clasp 407 can be used to open the left shoulder strap 406 so that the wearable electronic device 100 need not be passed over the user's head to be donned. While shown positioned along the left shoulder strap 406 in FIG. 4, the optional decoupling clasp 407 could be placed on the right shoulder strap 507 as well.

In this illustrative embodiment, a user actuation device 409, shown as a button in FIG. 4, is placed on a minor surface of the anterior pendant 101. The user actuation device 409 can be used to turn the wearable electronic device 100 ON, turn it OFF, and to perform other control operations as well. For example, a long press of the user actuation device 409 when the wearable electronic device 100 is OFF may turn the same ON, while short presses of the user actuation device 409 while the wearable electronic device 100 is ON may perform certain control operations such as track advance, pausing, playing, and so forth. A long press of the user actuation device 409 when the wearable electronic device 100 is ON may turn the wearable electronic device 100 OFF.

The wearable electronic device 100 again includes a plurality of audio outputs. In one or more embodiments, these comprise a left channel audio signal output 501 situated at a first end of the posterior pendant 102 and a right channel audio signal output 502 situated at a second end of the posterior pendant 102. In the illustrative embodiment of FIGS. 4-5, the left channel audio signal output 501 and the right channel audio signal output 502 are separated from each other by the body 503 of the posterior pendant 102. On the anterior pendant 101, a single combined left channel and right channel audio signal output 309 is situated at a cranial edge 402 of the anterior pendant 101.

As shown in FIG. 5, the first end of the posterior pendant 102, the base of the posterior pendant 102, and the second end of the posterior pendant define a caudally facing frustoconical posterior pendant major surface. This results in central axes 508,509 of the left channel audio signal output 501 and the right channel audio signal output 502 being directed downward and away from the user's ears.

Figure 6:
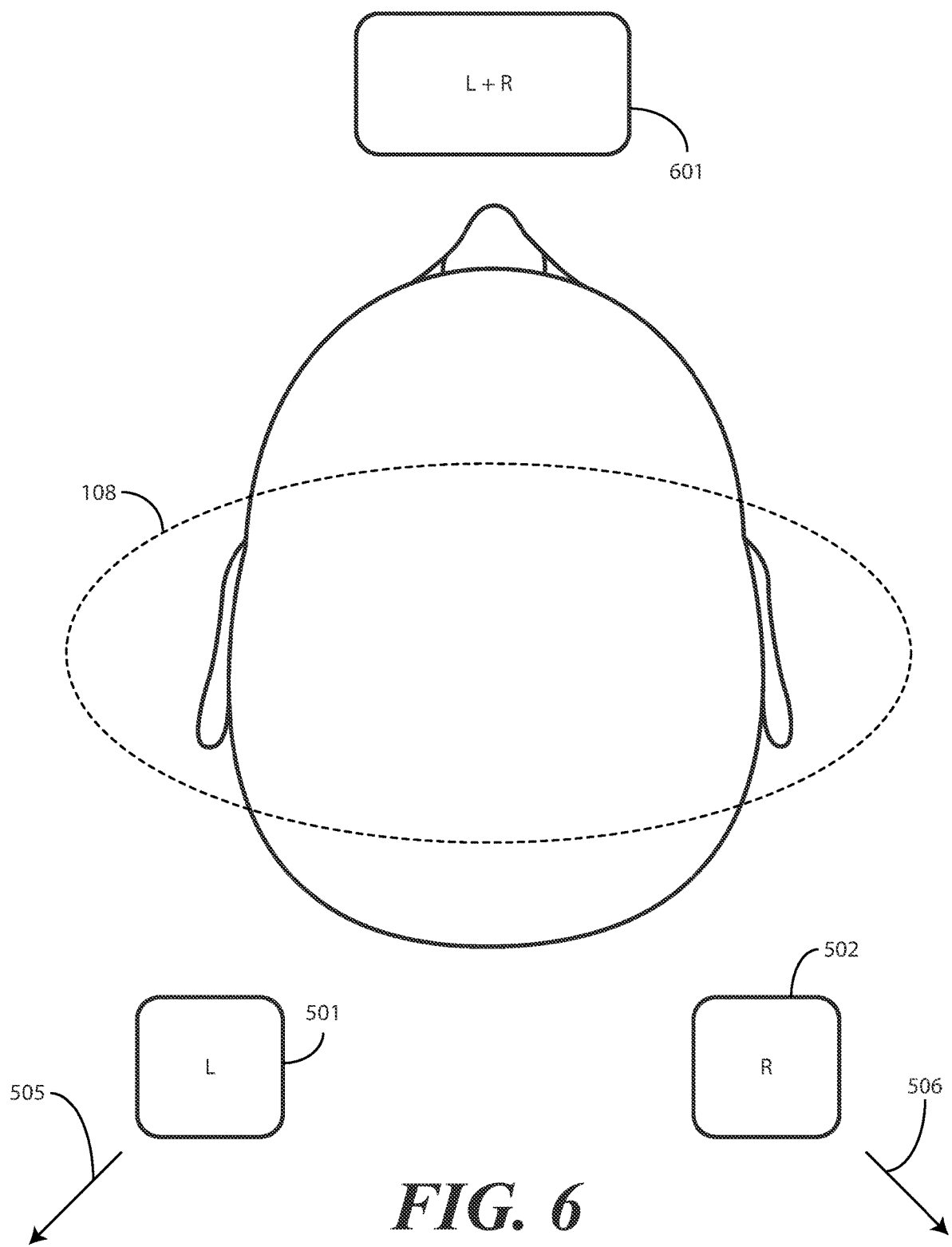
FIG. 6 illustrates a simplified schematic block diagram of one explanatory audio output arrangement for a wearable electronic device in accordance with one or more embodiments of the disclosure.

Turning now to FIG. 6, a simplified schematic diagram shows how the user 400 perceives audio as a centralized stereo image 108 from the various outputs shown in FIGS. 4-5. A left channel audio signal output 501 is delivered from a first side of the posterior pendant (102) to the user's ears. Meanwhile, a right channel audio signal output 502 is delivered from a second side of the posterior pendant (102) to the user's ears. The caudally and outwardly facing orientation of the central axes 508,509 of the left channel audio signal output 501 and the right channel audio signal output 502 results in maximum channel separation for the physical form factor of the posterior pendant (102), thereby creating a robust stereo image 108 for the user 400.

Without the anterior pendant (101), this stereo image 108 would situate above the posterior pendant (102), which would be perceived as being behind the user's head (because it is). However, by delivering a monaural audio signal output 601 combining the left channel audio signal output 501 and the right channel audio signal output 502 from the anterior pendant (101) pulls the stereo image 108 defined by the combination of the left channel audio signal output 501, the right channel audio signal output 502, and the monaural audio signal output 601 toward the anterior pendant (101), which situates the stereo image 108 at the user's ears as shown in FIG. 6.

Figure 7:
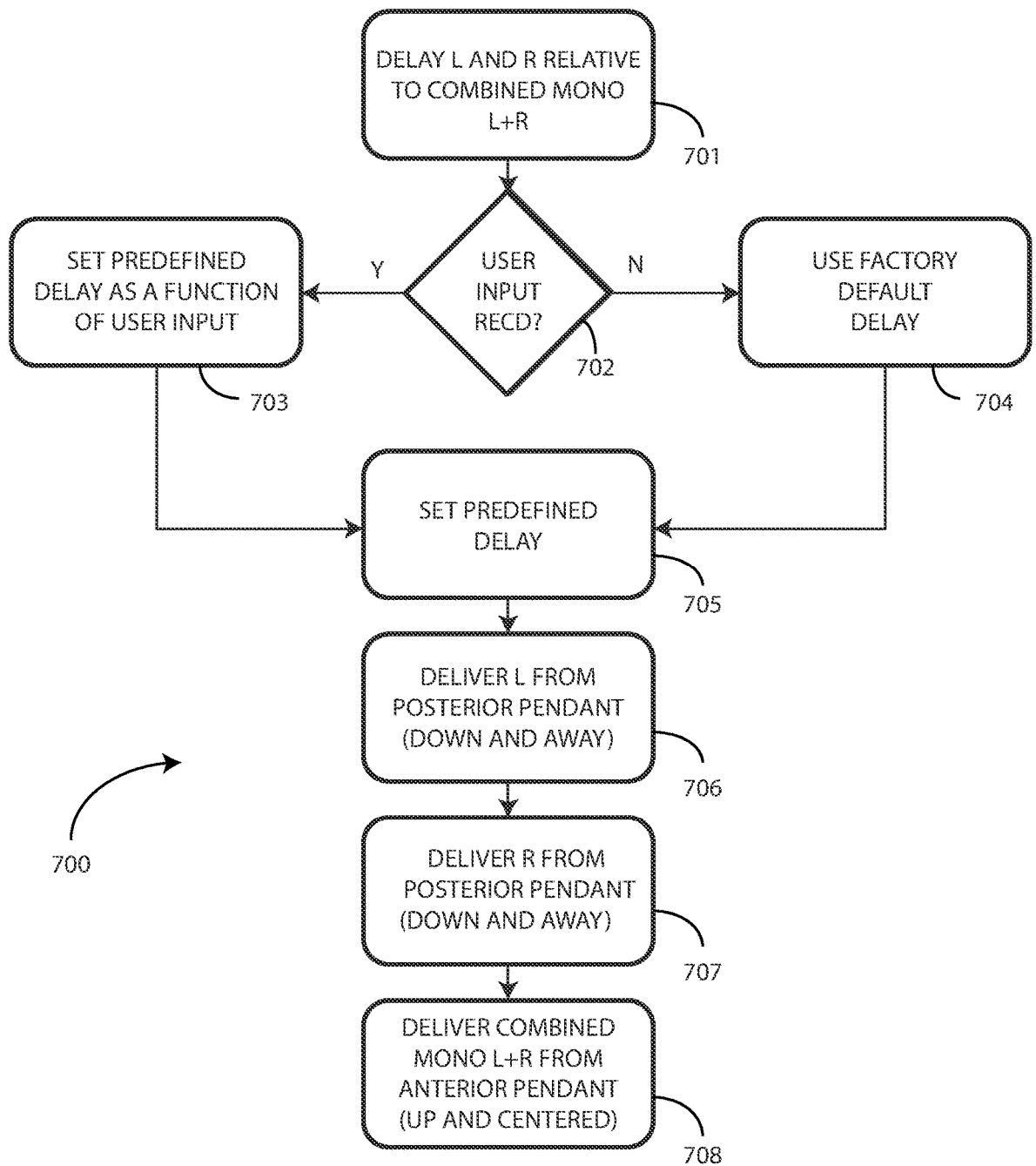
FIG. 7 illustrates one explanatory method in accordance with one or more embodiments of the disclosure.

Turning now to FIG. 7, illustrated therein is one explanatory method 700 for delivering acoustic signals from a wearable electronic device to a user in accordance with one or more embodiments of the disclosure. Beginning at step 701, a predefined delay is introduced between a monaural audio signal combining a left channel audio signal and a right channel audio signal and the left channel audio signal and right channel audio signal. When the acoustic signals are delivered at steps 706-708, the insertion of this predefined delay results in the method 700 delaying delivery of both the left channel audio signal output and the right channel audio signal output relative to the monaural audio signal output.

In one or more embodiments, the delay inserted at step 701 is user definable so as to allow a user to set the location of a stereo image resulting from the aural summation of the monaural audio signal output, the left channel audio signal output, and the right channel audio signal output by fading the stereo image forward or backward. Decision 702 determines whether such user input is received. Where it is, the user identified predefined delay can be determined at step 703 and applied at step 705 to fade the stereo image in accordance with the predefined delay. By contrast, where the user has not provided user input, a default predefined delay can be identified at step 704 and applied at step 705. In one or more embodiments, the default predefined delay is a function of the physical form factor of the wearable electronic device as well as the distances from the loudspeakers delivering the monaural audio signal output, the left channel audio signal output, and the right channel audio signal output from the user's ears. In one or more embodiments, this predefined delay is about 0.25 millisecond, although others will be obvious to those of ordinary skill in the art having the benefit of this disclosure.

At step 706, the method 700 delivers a left channel audio signal output from a first side of a posterior pendant of the wearable electronic device. At step 707, the method 700 delivers a right channel audio signal output from a second side of the posterior pendant. In one or more embodiments, steps 706 and 707 comprise delivering the left channel audio signal output and right channel audio signal output toward a caudal side of the wearable electronic device. In one or more embodiments, steps 706-707 comprise delivering the left channel audio signal output and the right channel audio signal output away from each other, and away from the posterior pendant. Thus, in one or more embodiments step 706 comprises delivering the left channel audio signal output by directing the same toward a caudal side of the wearable electronic device and away from the right channel audio signal output. Similarly, step 707 can comprise delivering the right channel audio signal output by directing the same toward the caudal side of the wearable electronic device and away from the left channel audio signal output to maximize channel separation of the acoustic signals.

At step 708, the method 700 delivers a monaural audio signal output combining, using a summation or additive function, the left channel audio signal output with the right channel audio signal output from an anterior pendant of the wearable electronic device to pull a stereo image defined by a combination of the left channel audio signal output, the right channel audio signal output, and the monaural audio signal output toward the anterior pendant. In one or more embodiments, step 708 directs the monaural audio signal output toward a cranial side of the wearable electronic device as previously described.

Advantageously, the wearable electronic device (100) of FIGS. 1-6, when used in accordance with the method 700 of FIG. 7, positions a single loudspeaker in an anterior pendant that provides a monaural audio signal output combining a left channel audio signal output and a right channel audio signal output, positioning an anterior pendant that delivers a left channel audio signal output and a right channel audio signal output. This arrangement of audio ports "pulls" the combined stereo image from the posterior pendant toward the anterior pendant to a central location within the wearable electronic device situated at locations corresponding to a wearer's ears. The use of an anterior pendant to deliver a combined left and right channel audio output, while using a posterior pendant to deliver separate left and right channel audio, is preferred by users as the stereo image defined by the combination of these three outputs provides a rich, enveloping stereo image that sounds as if located right at the user's ears.

Figure 8:
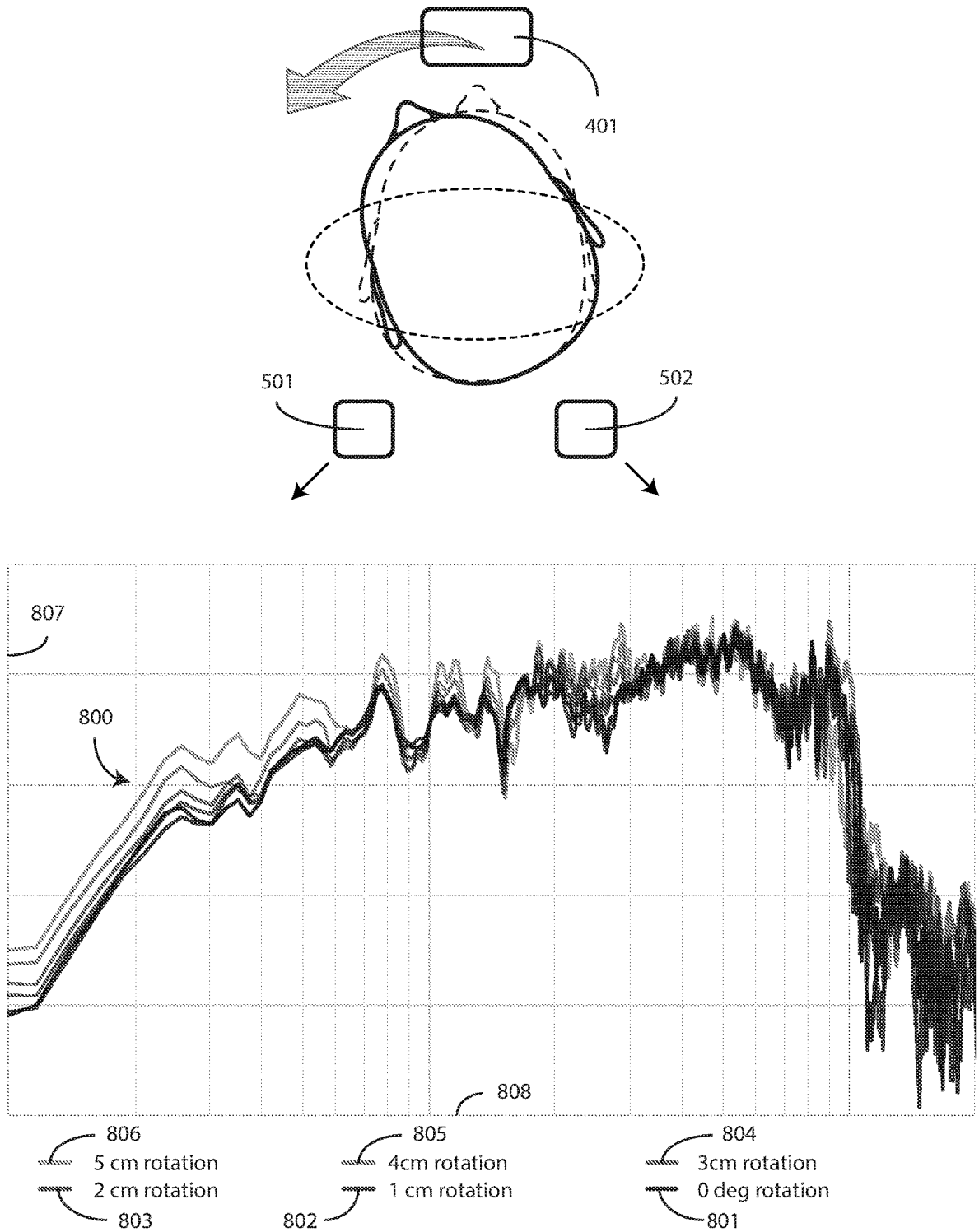
FIG. 8 illustrates how one portion of the audio loudness spectrum can change when a user wearing the wearable electronic device of FIGS. 1-6 turns their head in a first direction.
Figure 9:
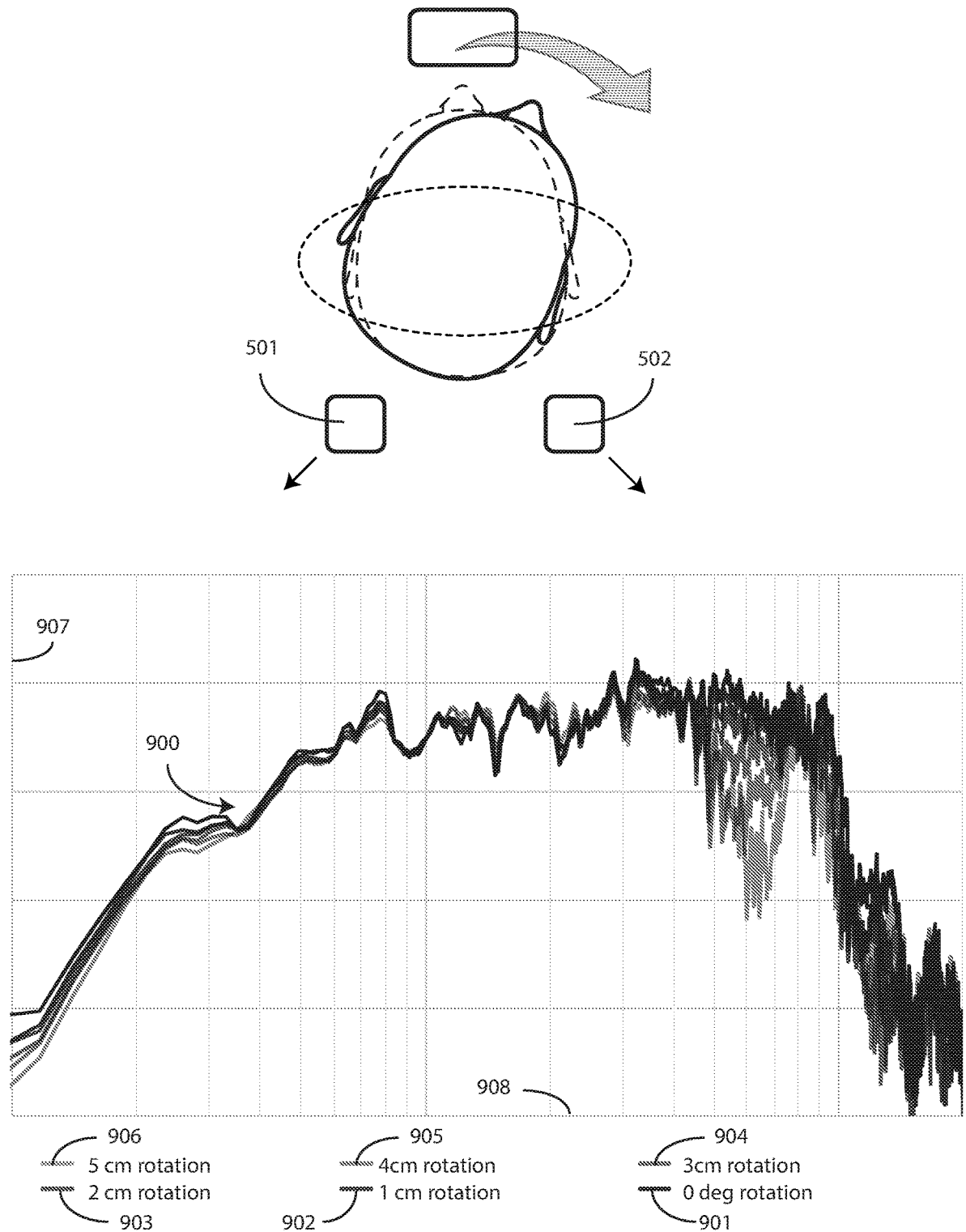
FIG. 9 illustrates how another portion of the audio loudness spectrum can change when a user wearing the wearable electronic device of FIGS. 1-6 turns their head in a first direction.

While this enveloping stereo image is amazing when the user's ears are centered within a centralized location within the wearable electronic device, embodiments of the disclosure contemplate that the perception of this rich, enveloping stereo image can change when the person turns their head to the left or right. This occurs because one ear may get closer to a first audio port, for example, while the other ear gets farther from a second audio port. This motion can cause the audio loudness spectrum to noticeably change. Turning now to FIGS. 8-9, illustrated therein is test data demonstrating how this can occur.

Beginning with FIG. 8, illustrated therein are several sound pressure level plots 800 illustrating the audio loudness spectrum and how it changes as a person moves their head to the left as perceived by the left ear. As shown in the figure, the user 400 turns their head toward the left channel audio signal output 501. This causes the left ear to get closer to the left channel audio signal output 501 while the right ear gets farther from the right channel audio signal output 502. In sum, the ears move within the stereo image 401 established when the user's head was facing forward.

The sound pressure level plots 800 of FIG. 8 illustrate what happens to the volume as the user's head continues to turn left. The vertical axis 807 represents sound pressure level in decibels, ranging from 20 dB SPL to 70 dB SPL. The horizontal axis 808 represents most of the audible spectrum, ranging from 100 Hertz to 20 kHz. There are six sound pressure level plots 801, 802, 803, 804, 805, 806 shown in FIG. 8. Each is illustrated with a different level of opacity, with darker sound pressure level plots 801, 802, 803 corresponding to head positions closer to looking straight ahead (the dashed line head drawing) and lighter sound pressure level plots 804, 805, 806 corresponding to head positions turned more to the left.

Sound pressure level plot 801 represents zero centimeters of rotation (facing forward as the dashed line outline of the head does) and is the darkest line of the sound pressure level plots 800. Sound pressure level plot 802 represents a left ear rotation to the left by one centimeter. Sound pressure level plot 803 represents a left ear rotation to the left by two centimeters. Sound pressure level plot 804 represents a left ear rotation to the left by three centimeters. Sound pressure level plot 805 represents a left ear rotation to the left by four centimeters. Sound pressure level plot 806 represents a left ear rotation to the left by five centimeters.

Two factors are important to note in FIG. 8: First, as the ear moves toward the left channel audio signal output 501, the sound pressure level gets larger. Illustrating by example, sound pressure level plot 802 is offset—on average—from sound pressure level plot 801 by 1.4 dB. Sound pressure level plot 803 is offset from sound pressure level plot 802 by 1 dB, while sound pressure level plot 804 is offset from sound pressure level plot 803 by 1.6 dB. Sound pressure level plot 805 is offset from sound pressure level plot 804 by 2 dB, while sound pressure level plot 806 is offset from sound pressure level plot 805 by 2.5 dB.

Next, notice that the absolute offset between the various sound pressure level plots 801, 802, 803, 804, 805, 806 is greatest at frequencies below five kilohertz. This separation can be seen most clearly below about 800 Hertz, as the various sound pressure level plots 801, 802, 803, 804, 805, 806 separate from each other the most in this region.

Turning now to FIG. 9, illustrated therein are several other sound pressure level plots 900 illustrating the audio loudness spectrum and how it changes as a person moves their head to the right, again as perceived by the left ear. As shown in the figure, the user 400 turns their head toward the right channel audio signal output 502. This causes the left ear to get farther from the left channel audio signal output 501 while the right ear gets closer to the right channel audio signal output 502. Once again, the ears move within the stereo image 401 established when the user's head was facing forward.

The sound pressure level plots 900 of FIG. 9 illustrate what happens to the volume—perceived by the left ear—as the user's head continues to turn right. As with FIG. 8, in FIG. 9 vertical axis 907 represents sound pressure level in decibels, ranging from 20 dB SPL to 70 dB SPL. The horizontal axis 908 represents most of the audible spectrum, ranging from 100 Hertz to kHz.

There are six sound pressure level plots 901, 902, 903, 904, 905, 906 shown in FIG. 9. Each is illustrated with a different level of opacity, with darker sound pressure level plots 901, 902, 903 corresponding to head positions closer to looking straight ahead (the dashed line head drawing) and lighter sound pressure level plots 904, 905, 906 corresponding to head positions turned more to the right.

Sound pressure level plot 901 represents zero centimeters of rotation (facing forward as the dashed line outline of the head does) and is the darkest line of the sound pressure level plots 900. Sound pressure level plot 902 represents a left ear rotation to the right by one centimeter. Sound pressure level plot 903 represents a left ear rotation to the right by two centimeters. Sound pressure level plot 904 represents a left ear rotation to the right by three centimeters. Sound pressure level plot 905 represents a left ear rotation to the right by four centimeters. Sound pressure level plot 906 represents a left ear rotation to the right by five centimeters.

Two factors are important to note in FIG. 9: First, as the ear moves away from the left channel audio signal output 501, the sound pressure level drops. Illustrating by example, sound pressure level plot 902 is offset—on average—from sound pressure level plot 901 by −1.3 dB. Sound pressure level plot 903 is offset from sound pressure level plot 902 by −1 dB, while sound pressure level plot 904 is offset from sound pressure level plot 903 by −1.1 dB. Sound pressure level plot 905 is offset from sound pressure level plot 904 by −0.9 dB, while sound pressure level plot 906 is offset from sound pressure level plot 905 by −0.9 dB.

Next, notice that the absolute offset between the various sound pressure level plots 901, 902, 903, 904, 905, 906 is greatest at frequencies above one kilohertz, and in particular between one kilohertz and twelve kilohertz. This separation can be seen most clearly below about five and twelve kilohertz, as the various sound pressure level plots 901, 902, 903, 904, 905, 906 separate from each other the most in this region.

Figure 10:
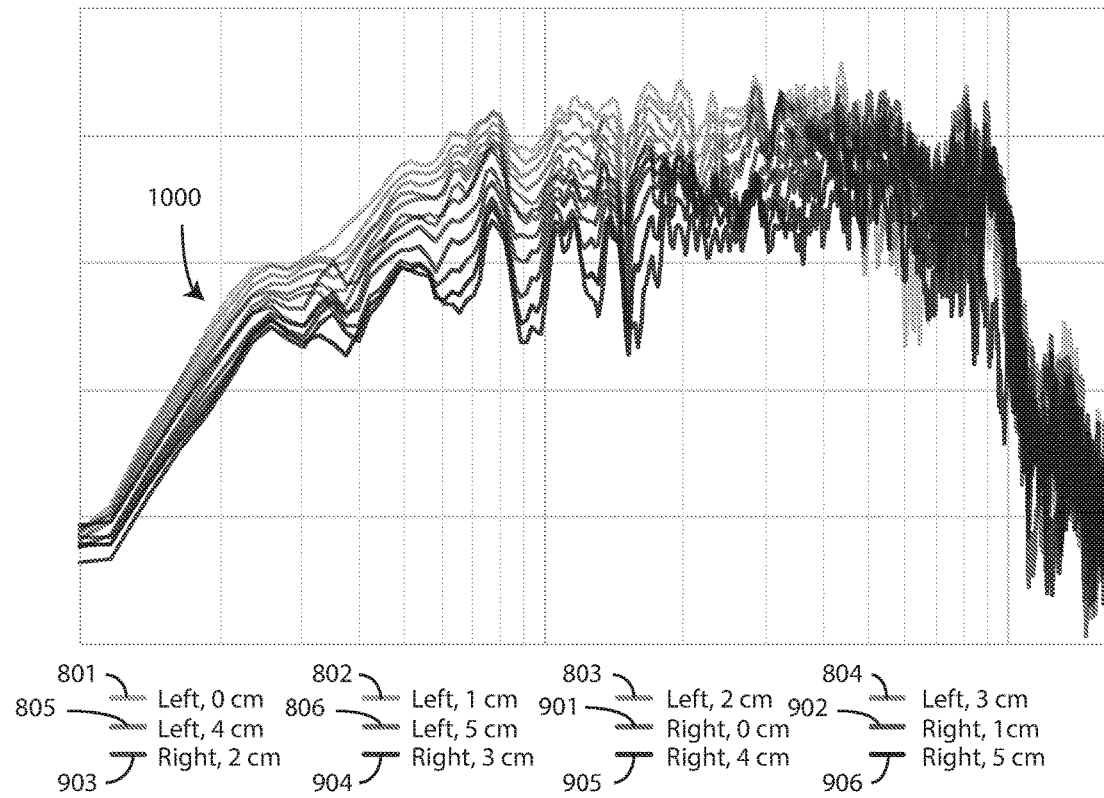
FIG. 10 illustrates a composite sound pressure level plot including plots from FIGS. 8 and 9.

A composite sound pressure level plot 1000 that includes both sound pressure level plots 801, 802, 803, 804, 805, 806 and sound pressure level plots 901, 902, 903, 904, 905, 906 is shown in FIG. 10. What this composite sound pressure level plot 1000 represents is that when the user's head turns to the right, with the left ear moving away from the left channel audio signal output, for about each ten degrees of rotation the sound pressure level that the left ear hears drops about 1.1 dB from the straight-ahead orientation. This drop is most prominent between 5-12 kHz.

By contrast, turning to the left adds about 1.3 dB to the sound pressure level for every ten degrees of rotation. This increase in sound pressure level is most prominent below one kilohertz. As shown in the table 1800 of FIG. 18, embodiments of the disclosure contemplate that the rotation of the head may cause the time of arrival of audio signals to shift as well.

The takeaway is that when a wearable electronic device configured in accordance with embodiments of the disclosure is being worn by a user, the rich, enveloping stereo image perceived when the head is looking forward may change when the head is turned from side to side. If the wearable electronic device is being used in an VR/AR experience, this change in the perceived stereo image may distract a person from the VR/AR environment and take them "out of" that experience. What's more, as a person rotates their head the time of arrival of each audio signal may shift, thereby taking them farther away from that rich, enveloping sound they enjoyed while their ears were in the centralized location within the wearable electronic device.

Embodiments of the disclosure advantageously provide a solution to this issue by receiving signals from one or more motion detectors positioned in a companion electronic device worn on a person's head, one example of which is an VR/AR device configured as VR/AR glasses. Using signals from the one or more motion detectors of the companion electronic device, one or more processors in the wearable audio device can determine an angle of rotation from center (when the user is facing straight ahead) and can use this information to determine the orientation of the person's head relative to the anterior pendant and posterior pendant of the wearable audio device.

One or more processors of the wearable audio electronic device can begin monitoring changes in signals situated in the wearable audio electronic device and in the signals from the motion detectors of the VR/AR device. When these signals indicate that the orientation of the VR/AR device relative to the wearable audio electronic device have changed in three-dimensional space, this serves as a proxy that the orientation of the person's head has changed in three-dimensional space due to the fact that the VR/AR device is being worn on the head and the wearable audio electronic device is being worn around the neck. Accordingly, one or more processors of the wearable audio electronic device can adjust speaker output settings accordingly so as to minimize or eliminate any changes in the audio loudness spectrum when the person turns their head.

Figure 11:
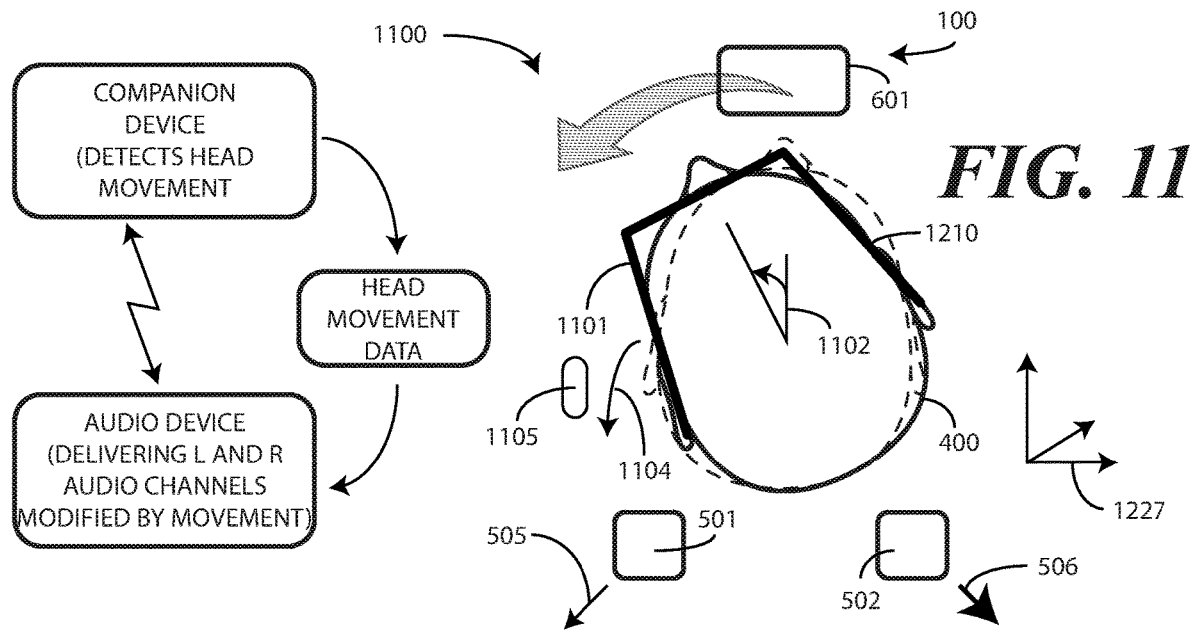
FIG. 11 illustrates a simplified schematic block diagram of one explanatory audio output system in accordance with one or more embodiments of the disclosure.

This adjustment of the speaker output settings can occur in predefined stepped stages, such as every time the person moves their head by more than ten degrees in one or more embodiments. Additionally, changes can be made to multiple speakers. For instance, when a user turns to the left, the mid-range of the audible spectrum (presumed to be 20 Hertz to 20 kHz in this disclosure) emanating from the speaker closer to the right ear can be amplified while the low-end of the audible spectrum emanating from the speaker closer to the left ear may be reduced. Turning now to FIG. 11, illustrated therein is one such system 1100 illustrating how these adjustments can be made.

Figure 12:
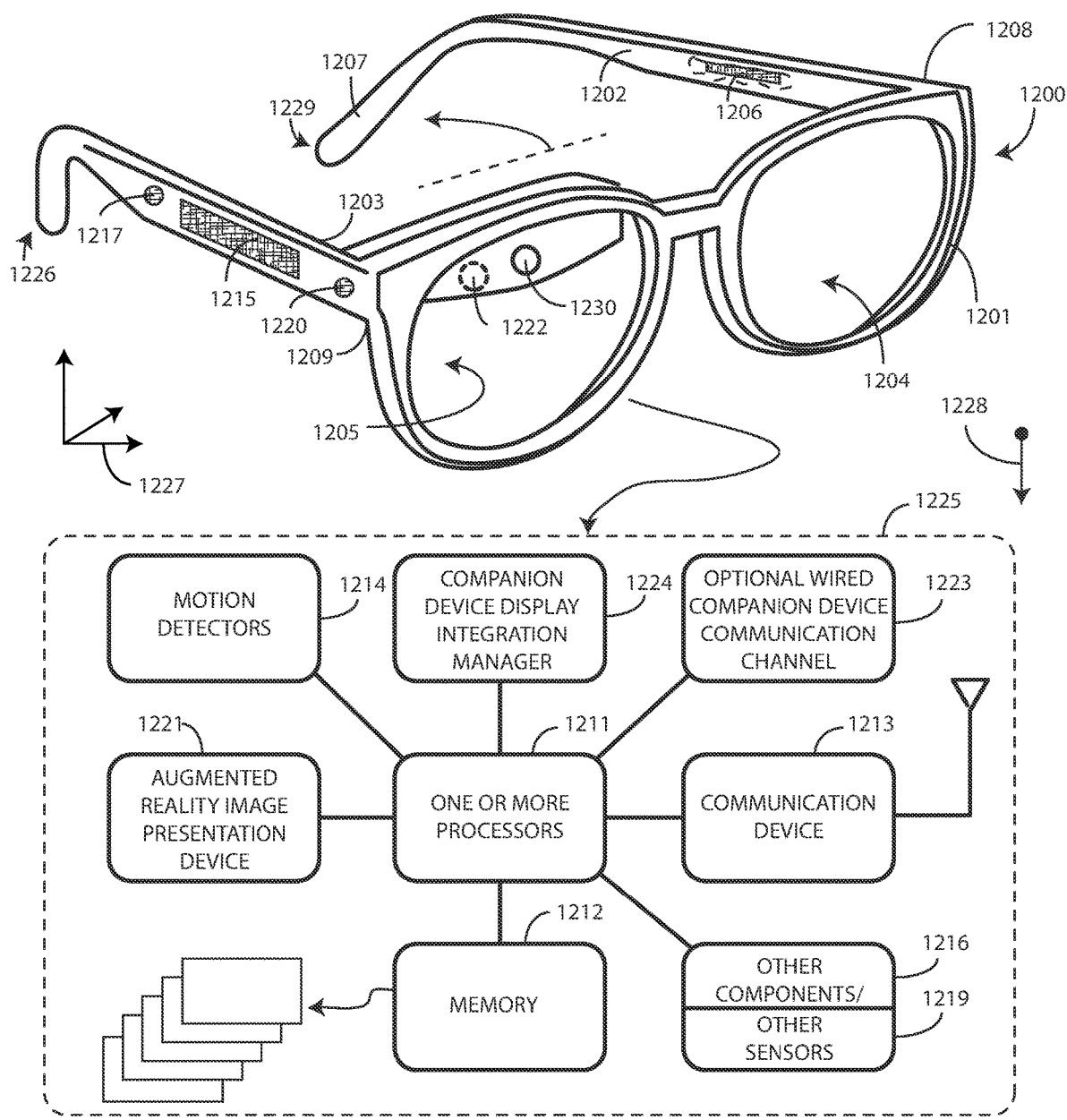
FIG. 12 illustrates one explanatory VR/AR device in accordance with one or more embodiments of the disclosure.

As shown in FIG. 11, a user 400 is wearing a first electronic device 1101. In this example, the first electronic device 1101 is a VR/AR device and in particular, a pair of augmented reality glasses that is being worn on the user's head. Turning briefly to FIG. 12, illustrated therein is one such VR/AR device.

The VR/AR device of FIG. 12 is an augmented reality device 1200. In the illustrative embodiment of FIG. 12, the augmented reality device 1200 comprises augmented reality glasses. However, this is for explanatory purposes only, as the augmented reality device 1200 could be configured in any number of other ways as well. Illustrating by example, the augmented reality device 1200 could also be configured as any of sunglasses, goggles, masks, shields, or visors. Other forms of the augmented reality device 1200 will be obvious to those of ordinary skill in the art having the benefit of this disclosure. Additionally, the VR/AR device could be an augmented reality device rather than a virtual reality device.

The augmented reality device 1200 of FIG. 12 includes a frame 1201 and one or more stems 1202,1203. Here, the one or more stems 1202,1203 comprise a first stem 1202 and a second stem 1203. One or more lenses 1204,1205 can be disposed within the frame 1201. The lenses 1204,1205 can be prescription or non-prescription, and can be clear, tinted, or dark.

In one or more embodiments the stems 1202,1203 are pivotable from a first position where they are situated adjacent to, and parallel with, the frame 1201, to a second, radially displaced open position shown in FIG. 12. However, in other embodiments the stems 1202,1203 may be fixed relative to the frame 1201. In still other embodiments, such as might be the case if the augmented reality device 1200 were configured as goggles, the stems 1202,1203 may be flexible or soft. For example, the stems of goggles are frequently elasticized fabric, which is soft, flexible, pliable, and stretchy. Other types of stems 1202,1203 will be obvious to those of ordinary skill in the art having the benefit of this disclosure.

In one or more embodiments the stems 1202,1203 attach to the frame 1201 at a first end 1208,1209 and extend distally from the frame 1201 to a second, distal end 1226,1229. In one embodiment, each stem 1202,1203 includes a temple portion 1206 and an ear engagement portion 1207. The temple portion 1206 is the portion of the stem 1202,1203 passing from the frame 1201 past the temple of a wearer, while the ear engagement portion 1207 engages the wearer's ear to retain the augmented reality glasses to the wearer's head.

Since the augmented reality device 1200 is configured as an electronic device, one or both of the frame 1201 and the stems 1202,1203 can comprise one or more electrical components. These electrical components are shown illustratively in a schematic block diagram 1225 in FIG. 12. It will be clear to those of ordinary skill in the art having the benefit of this disclosure that the electrical components and associated modules can be used in different combinations, with some components and modules included and others omitted. Components or modules can be included or excluded based upon need or application.

The electronic components can include one or more processors 1211. The one or more processors 1211 can be disposed in one or both of the stems 1202,1203 or the frame 1201. The one or more processors 1211 can be operable with a memory 1212. The one or more processors 1211, which may be any of one or more microprocessors, programmable logic, application specific integrated circuit device, or other similar device, are capable of executing program instructions and methods described herein. The program instructions and methods may be stored either on-board in the one or more processors 1211, or in the memory 1212, or in other computer readable media coupled to the one or more processors 1211.

The one or more processors 1211 can be configured to operate the various functions of the augmented reality device 1200 and also to execute software or firmware applications and modules that can be stored in a computer readable medium, such as memory 1212. The one or more processors 1211 execute this software or firmware, in part, to provide device functionality. The memory 1212 may include either or both static and dynamic memory components, may be used for storing both embedded code and user data.

In one or more embodiments, the augmented reality device 1200 also includes an optional communication device 1213. In one or more embodiments, the communication device 1213 is wireless. However, in other embodiments the communication device 1213 includes a wired connection to a companion device, one example of which is the wearable audio electronic device (100) of FIG. 1. Illustrating by example, the augmented reality device 1200 could be tethered to the wearable audio electronic device (100) by a USB cable or other wired connection. Where included, the communication device 1213 is operable with the one or more processors 1211 and is used to facilitate electronic communication with one or more electronic devices or servers or other communication devices across a network. Note that it is possible to combine the one or more processors 1211, the memory 1212, and the communication device 1213 into a single device, or alternatively into devices having fewer parts while retaining the functionality of the constituent parts.

The wireless communication device 1213, which may be one of a receiver or transmitter, and may alternatively be a transceiver, operates in conjunction with the one or more processors 1211 to electronically communicate through a communication network. For example, in one embodiment, the wireless communication device 1213 can be configured to communicate through a traditional cellular network. Other examples of networks with which the communication circuit may communicate include proprietary networks and direct communication networks. In other embodiments, the wireless communication device 1213 can communicate with near field or local area networks, infrared communication circuits, magnetic field modulation circuits, and Wi-Fi circuits. In one or more embodiments, the wireless communication device 1213 can be configured to provide messaging functionality to deliver electronic messages to remote devices.

A battery or other energy storage device can be included to provide power for the various components of the augmented reality device 1200. It will be obvious to those of ordinary skill in the art having the benefit of this disclosure that other energy storage devices can be used instead of the battery, including a micro fuel cell or an electrochemical capacitor. Moreover, where the augmented reality device 1200 includes a port for a wired interface, such as a USB cable, power can be delivered through this cable, thereby eliminating the need for a battery. The battery can include a lithium-ion cell, lithium polymer cell, or a nickel metal hydride cell, such cells having sufficient energy capacity, wide operating temperature range, large number of charging cycles, and long useful life. The battery may also include overvoltage and overcurrent protection and charging circuitry. In one embodiment, the battery comprises a small, lithium polymer cell.

In one or more embodiments, a photovoltaic device 1215, such as a solar cell, can be included to recharge the battery. In one embodiment, the photovoltaic device 1215 can be disposed along the temple portion 1206 of the stems 1202, 1203. In this illustrative embodiment, two solar cells are disposed in the temple portion 1206 of each stem 1202,1203, respectively.

Other components 1216 can be optionally included in the augmented reality device 1200 as well. For example, in one embodiment one or more microphones can be included as audio capture devices 1217. These audio capture devices can be operable with the one or more processors 1211 to receive voice input. Additionally, in one or more embodiments the audio capture devices 1217 can capture ambient audio noise. Signals corresponding to captured audio can be transmitted to an electronic device in communication with the augmented reality device 1200 or a server or cloud-computing device. The other component 1216 can additionally include loudspeakers for delivering audio content to a user wearing the augmented reality device 1200.

The other components 1216 can also include a motion generation device for providing haptic notifications, vibration notifications, haptic feedback, or vibrational sensations to a user. For example, a piezoelectric transducer, rotational motor, or other electromechanical device can be configured to impart a force or vibration upon the temple portion 1206 of the stems 1202,1203, or alternatively along the frame 1201. The motion generation device can provide a thump, bump, vibration, or other physical sensation to the user. The one or more processors 1211 can be configured to actuate the motion generation device to deliver a tactile or vibration output alone or in combination with other outputs such as audible outputs.

Similarly, in one or more embodiments the augmented reality device 1200 can include a video capture device 1230 such as an imager. The imager can be disposed within the frame 1201 or stems 1202,1203. In one or more embodiments, the video capture device 1230 can function as a to detect changes in optical intensity, color, light, or shadow in the near vicinity of the augmented reality device 1200. As with the audio capture device 1217, captured video information can be transmitted to an electronic device, a remote server, or cloud-computing device.

Other sensors 1219 can be optionally included in the augmented reality device 1200. One example of such a sensor is a global positioning system device for determining where the augmented reality device 1200 is located. The global positioning system device can communicate with a constellation of earth orbiting satellites or a network of terrestrial base stations to determine an approximate location. While a global positioning system device is one example of a location determination module, it will be clear to those of ordinary skill in the art having the benefit of this disclosure that other location determination devices, such as electronic compasses or gyroscopes, could be used as well.

The other sensors 1219 can also include an optional user interface. The user interface can be used, for example, to activate the circuit components or turn them OFF, control sensitivity of the other sensors 1219, receive user input, and so forth. The user interface, where included, can be operable with the one or more processors 1211 to deliver information to, and receive information from, a user. The user interface can include a rocker switch, slider pad, button, touch-sensitive surface, or other controls, and optionally a voice command interface. These various components can be integrated together.

In one or more embodiments, an audio output device 1220, such as a loudspeaker or other transducer, can deliver audio output to a user. For example, piezoelectric transducers can be operably disposed within the stems 1202,1203. Actuation of the piezoelectric transducers can cause the stems 1202,1203 to vibrate, thereby emitting acoustic output. More traditional audio output devices 1220, such as loudspeakers, can be used as well. The inclusion of both the audio output device 1220 and the haptic device allows both audible and tactile feedback to be delivered.

In one or more embodiments, the augmented reality device 1200 includes an augmented reality image presentation device 1221 operable to deliver augmented reality imagery to a user. This augmented reality imagery is referred to as an augmented reality environment because it is this imagery that the user experiences when interacting with the augmented reality device 1200. The augmented reality image presentation device 1221 can be operable with a projector 1222. In the illustrative embodiment of FIG. 12, the frame 1201 supports the projector 1222. In one or more embodiments the projector 1222 is configured to deliver images to a holographic optical element when the augmented reality device 1200 is operating in an augmented reality mode of operation.

In one embodiment, the projector 1222 is a modulated light projector operable to project modulated light images along a surface or holographic optical element. In another embodiment, the projector 1222 is a thin micro projector. In another embodiment, the projector 1222 can comprise a laser projector display module. Other types of projectors will be obvious to those of ordinary skill in the art having the benefit of this disclosure.

In one or more embodiments, the projector 1222 can include a lens and a spatial light modulator configured to manipulate light to produce images, including the virtual elements that appear in the augmented reality environment. The projector 1222 can include a light source, such as a single white light emitting diode, multiple separate color light emitting diodes, or multiple separate color laser diodes that deliver visible light to the spatial light modulator through a color combiner. The augmented reality image presentation device 1221 can drive the spatial light modulator to modulate the light to produce images. The spatial light modulator can be optically coupled (e.g., by free space propagation) to the lens and/or a beam steerer. Where used, a beam steerer serves to steer a spatially modulated light beam emanating from the spatial light modulator through the lens to create images.

One or more motion detectors 1214 can be configured as an orientation detector that determines an orientation and/or movement of the augmented reality device 1200 in three-dimensional space. Illustrating by example, the motion detectors 1214 can include an accelerometer, gyroscopes, or other device to detect device orientation and/or motion of the augmented reality device 1200 in three-dimensional space 1227. Using an accelerometer as an example, an accelerometer can be included to detect motion of the augmented reality device 1200. Additionally, the accelerometer can be used to sense some of the gestures of the user, such as those made by predefined movements of the head.

The motion detectors 1214 can determine the spatial orientation and/or motion of an augmented reality device 1200 in three-dimensional space 1227 by, for example, detecting a gravitational direction 1228 and acceleration due to applied forces. In addition to, or instead of, an accelerometer, an electronic compass can be included to detect the spatial orientation of the augmented reality device 1200 relative to the earth's magnetic field. Similarly, one or more gyroscopes can be included to detect rotational orientation of the augmented reality device 1200.

In one or more embodiments, the one or more motion detectors 1214 comprise one or more inertial motion units. In one embodiment, the augmented reality device 1200 includes only a single inertial motion unit that is situated, for example, in one of the stems 1202,1203 or, alternatively, the frame 1201. In another embodiment, the augmented reality device 1200 optionally includes a second inertial motion unit that is situated in the other of the stems 1202,1203, or alternatively in the frame 1201. Additional inertial motion units can be included as necessitated by a particular application. For example, the augmented reality device 1200 could include three inertial motion units, with one situated in stem 1202, another situated in stem 1203, and a third situated in the frame 1201.

In one or more embodiments, each inertial motion unit comprises a combination of one or more accelerometers and one or more gyroscopes, and optionally one or more magnetometers, to determine the orientation, angular velocity, and/or specific force of the augmented reality device 1200. When included in the augmented reality device 1200, these inertial motion units can be used as orientation sensors to measure the orientation of one or more of the frame 1201 and/or stems 1202,1203 in three-dimensional space 1227. Similarly, the inertial motion units can be used as orientation sensors to measure the motion of one or more of the frame 1201 and/or stems 1202,1203 in three-dimensional space 1227. The inertial motion units can be used to make other measurements as well.

In one or more embodiments, the inertial motion unit(s) can be configured as orientation detectors that determine the orientation and/or movement of the augmented reality device 1200 in three-dimensional space 1227. Illustrating by example, the inertial motion unit can determine the spatial orientation of the augmented reality device 1200 in three-dimensional space 1227 by, for example, detecting a gravitational direction 1228 using an accelerometer. In addition to, or instead of, an accelerometer, magnetometers can be included to detect the spatial orientation of the electronic device relative to the earth's magnetic field. Similarly, one or more gyroscopes can be included to detect rotational orientation of the augmented reality device 1200.

Motion of the augmented reality device 1200 can similarly be detected. The accelerometers, gyroscopes, and/or magnetometers can be used as a motion detector 1214 in the augmented reality device 1200. The inertial motion unit(s) can also be used to determine the spatial orientation of the augmented reality device 1200 in three-dimensional space 1227 by detecting a gravitational direction 1228. Similarly, the gyroscopes can be included to detect rotational motion of the augmented reality device 1200.

In one or more embodiments, the inertial motion unit(s) determine an orientation of the device housing in which it is situated in three-dimensional space. For example, where only one inertial motion unit is included in the first stem 1202, this inertial motion unit is configured to determine an orientation, which can include measurements of azimuth, plumb, tilt, velocity, angular velocity, acceleration, and angular acceleration, of the first stem 1202. Similarly, where two inertial motion units are included, with one inertial motion unit being situated in the first stem 1202 and another inertial motion unit being situated in the second stem 1203, each inertial motion unit determines the orientation of its respective stem. Each inertial motion unit can determine measurements of azimuth, plumb, tilt, velocity, angular velocity, acceleration, angular acceleration, and so forth. In one or more embodiments, each inertial motion unit can determine deviation of the augmented reality device 1200 from each axis of the three-dimensional space 1227 across time in radians per second.

In one or more embodiments, each inertial motion unit delivers these orientation measurements to the one or more processors 1211 in the form of orientation determination signals. Said differently, in one or more embodiments each inertial motion unit outputs an orientation determination signal comprising the determined orientation of its respective device housing.

In one or more embodiments, the augmented reality device 1200 includes a companion device display integration manager 1224. The companion device display integration manager 1224 can be used to communicate with a companion electronic device, one example of which is the wearable electronic device (100) of FIG. 1.

The augmented reality device 1200 of FIG. 12 can operate as a stand-alone electronic device in one or more embodiments. However, in other embodiments, the augmented reality device 1200 can operate in tandem with another electronic device, via wireless electronic communication using the wireless communication device 1213, or via a wired connection channel 1223 to form an augmented reality system.

Turning now back to FIG. 11, the user 400 is also using the wearable electronic device 100 of FIG. 1, which is represented in FIG. 11 by the left channel audio signal output 501, the right channel audio signal output 502, and the monaural audio signal output 601.

In one or more embodiments, the first electronic device 1101 comprises one or more motion detectors determining an orientation 1102 of the first electronic device 1101 in three-dimensional space 1227. The first electronic device 1101 also includes a first communication device communicating 1104 and indication 1105 of the orientation 1102 of the first electronic device 1101 to the wearable electronic device 100, which represents the second electronic device of the system 1100.

The wearable electronic device 100 includes at least one a first audio output represented by the left channel audio signal output 501 and a second audio output represented by the right channel audio signal output 502. Each delivers audio signals in the form of audio signal output 505,506 to an environment of the wearable electronic device 100.

As described above with reference to FIG. 1, in one or more embodiments the wearable electronic device 100 includes a second communication device. In one or more embodiments, the second communication device receives the indication 1105 of the orientation 1102 of the first electronic device 1101 in the three-dimensional space 1227. One or more processors of the wearable electronic device 100 cause at least one of the left channel audio signal output 501 and/or the right channel audio signal output 502 to alter the audio signals in the form of audio signal output 505,506 when the orientation 1102 of the first electronic device 1101 in the three-dimensional space 1227 changes.

In the illustrative example of FIG. 11, both the first electronic device 1101 and the second electronic device represented by the wearable electronic device 100 are wearable electronic devices. Moreover, as shown the first electronic device 1101 and the second electronic device represented by the wearable electronic device 100 are physically separate devices. The first electronic device 1101 comprises an eyewear device and the second electronic device represented by the wearable electronic device 100 comprises a neck-encircling audio device.

In the illustrative example of FIG. 11, the head of the user 400 turns to the left. Accordingly, the left ear gets closer to the left channel audio signal output 501, while the right ear gets farther from the right channel audio signal output 502. Accordingly, the one or more processors of the wearable electronic device 100 cause at least one of the first audio output represented by the left channel audio signal output 501 and/or the second audio output represented by the right channel audio signal output 502 to alter the audio signals in the form of audio signal output 505,506.

Since the left ear is getting closer to the left channel audio signal output 501, audio signal output 505 emanating from the left channel audio signal output 501—or at least portions thereof—should get quieter due to the effect described above with reference to FIG. 8. Similarly, audio signal output 506 emanating from the right channel audio signal output 502—or at least a portion thereof—should get louder due to the effect described above with reference to FIG. 9.

Accordingly, in one or more embodiments the one or more processors of the wearable electronic device (100) increase a first volume of at least a portion of the audio signal output 506 emanating from the right channel audio signal output 502 when the orientation 1102 of the first electronic device 1210 in three-dimensional space 1227 changes in a first direction, which is to the left in this example. In one or more embodiments, the first portion of the audio signal output 506 emanating from the right channel audio signal output 502 that have their volume increase have frequencies above one kilohertz. Thus, while the audio signal output 506 emanating from the right channel audio signal output 502 include the full audio spectrum, when the user 400 turns their head to the left those portions having frequencies above one kilohertz are amplified in one or more embodiments. This is illustrated by the fact that the line depicting the audio signal output 506 is darker.

Similarly, since the left ear is getting closer to the left channel audio signal output 501, audio signal output 505 emanating from the left channel audio signal output 501—or at least portions thereof—should get louder due to the effect described above with reference to FIG. 8. Accordingly, in one or more embodiments the one or more processors of the wearable electronic device (100) decrease a second volume of at least a portion of the audio signal output 505 emanating from the left channel audio signal output 501 when the orientation 1102 of the first electronic device 1210 in three-dimensional space 1227 changes in the first direction, which again is to the left in this example. In one or more embodiments, the portion of the audio signal output 505 emanating from the left channel audio signal output 501 that have their volume decrease have frequencies below five kilohertz. Thus, while the audio signal output 505 emanating from the left channel audio signal output 501 include the full audio spectrum, when the user 400 turns their head to the left those portions having frequencies below five kilohertz are quieted in one or more embodiments. This is illustrated by the fact that the line depicting the audio signal output 505 is lighter.

Figure 13:
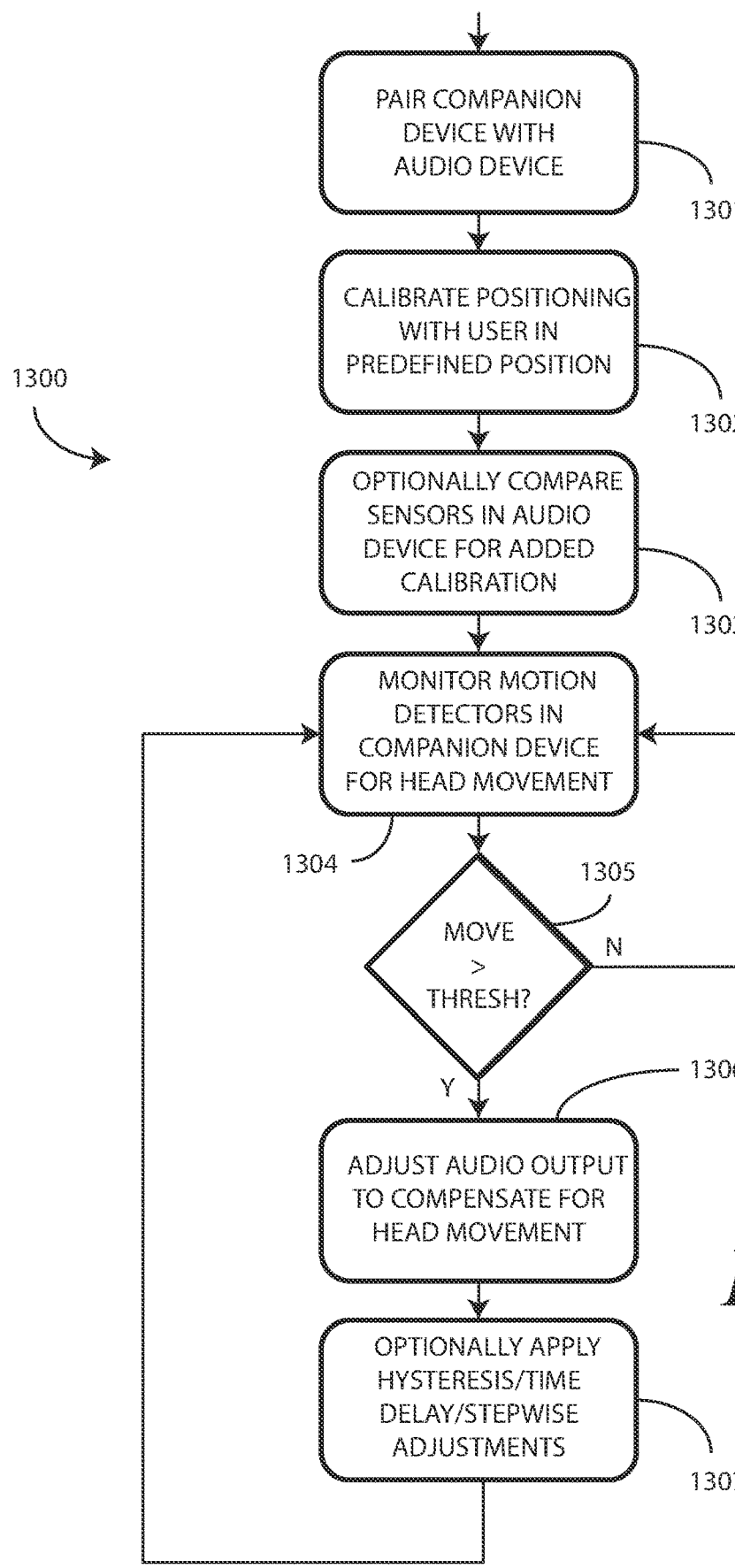
FIG. 13 illustrates another explanatory method in accordance with one or more embodiments of the disclosure.

Turning now to FIG. 13, illustrated therein is a method 1300 generalizing the operation of the system (1100) of FIG. 11. As described above, the system (1100) of FIG. 11 includes an electronic device represented by wearable audio electronic device and a companion electronic device represented by the augmented reality glasses. As such, at step 1301 the wearable audio electronic device is paired to the companion electronic device.

At step 1302, an optional calibration step occurs. Illustrating by example, when a person first dons the companion electronic device, one example of which is a VR/AR device, in one or more embodiments that person is asked to position virtual elements in an VR/AR environment at step 1302 so that these virtual elements can be located as the person looks around in the VR/AR environment. During this setup process, one or more processors of the wearable audio electronic device can calibrate signals at step 1303 both from motion detectors situated in the wearable audio electronic device and signals received at the wearable audio electronic device from the companion electronic device by asking the person to look straight ahead, optionally at a selected virtual element in the VR/AR environment.

In one or more embodiments, steps 1302 and 1303 comprises performing a calibration process identifying an initial orientation of the companion electronic device relative to a first audio port and a second audio port of the wearable audio electronic device. For instance, when the wearable audio electronic device is configured as described above with reference to FIG. 1 and includes an anterior pendant, a posterior pendant, a left shoulder strap coupling left sides of the anterior pendant and posterior pendant together, and a right shoulder strap coupling right sides of the anterior pendant and the posterior pendant together, the posterior pendant can include a left channel audio signal output situated at a first end of the posterior pendant and a right channel audio signal output situated at a second end of the posterior pendant separated from the first end of the posterior pendant by a posterior pendant body. Where this is the case, steps 1302 and 1303 can comprise performing a calibration process to identify an initial orientation of the companion electronic device relative to the first audio port at the left channel audio signal output and the second audio port at the right channel audio signal output.

Once this initial calibration is completed, at step 1304 one or more processors of the wearable audio electronic device can begin monitoring changes in signals situated in the wearable audio electronic device and in the signals from the motion detectors of the companion electronic device. In one or more embodiments, this step 1304 comprises receiving signals from the companion electronic device indicating an orientation of the companion electronic device relative to the wearable audio electronic device. In one or more embodiments, step 1304 further comprises confirming the orientation of the companion electronic device has changed by determining, from one or more orientation sensors of the electronic device, another orientation of the electronic device in three-dimensional space.

The method 1300 of FIG. 13 can be performed continuously or in a stepwise manner, depending upon whether optional decision 1305 is included in the method 1300. When this decision is omitted, step 1306 comprises increasing a first sound volume associated with first audio emanating from a first audio port when the orientation of the companion electronic device rotates in a first direction relative to the wearable audio electronic device, and increasing a second sound volume associated with second audio emanating from a second audio port when the orientation of the companion electronic device rotates in a second direction relative to the electronic device that is opposite the first direction. This adjustment would be for the audio port associated with an ear moving away therefrom when the companion electronic device rotates relative to the wearable audio electronic device.

The adjustment can also include decreasing a volume of sound emanating from an anterior pendant associated with an ear moving closer thereto when the companion electronic device rotates relative to the wearable audio electronic device. Accordingly, step 1306 can comprise decreasing the first sound volume associated with the first audio emanating from the first audio port when the orientation of the companion electronic device rotates in the second direction relative to the wearable audio electronic device, and decreasing the second sound volume associated with the second audio emanating from the second audio port when the orientation of the companion electronic device rotates in the first direction relative to the electronic device that is opposite the first direction.

Accordingly, any movement of the companion electronic device relative to the wearable audio electronic device causes a change in sound volume emanating from a particular audio port. As noted above, only portions of the full audio spectrum may be adjusted to conserve processing power. In one or more embodiments, for increasing volumes amplification is applied to frequencies above one kilohertz while frequencies below one kilohertz remain unamplified. In one or more embodiments, for decreasing volumes gain is reduced for frequencies below five kilohertz while the volumes of frequencies above five kilohertz are unadjusted, and so forth.

While this works well in practice, it requires a constant feedback loop and constant volume adjustments and, therefore, considerable processing power. To simplify the method 1300 and reduce the amount of processing power required, the inclusion of decision 1305 performs the volume adjustment only when the rotation of the companion electronic device relative to the wearable audio electronic device exceeds a predefined threshold. For example, a first volume adjustment may be made only once the companion electronic device has rotated at least ten degrees relative to the wearable audio electronic device, with a second volume adjustment not being made until the companion electronic device has rotated at least twenty degrees relative to the wearable audio electronic device. A third volume adjustment may be made when the companion electronic device has rotated at least thirty degrees relative to the wearable audio electronic device. In some embodiments, additional adjustments can be made when the companion electronic device rotates by additional thresholds. In other embodiments, only three adjustments will be made with the last adjustment occurring when the companion electronic device has rotated relative to the wearable audio electronic device by at least thirty degrees. Additionally, the ten-degree increments described in this paragraph are illustrative only, as other predefined rotation thresholds triggering volume adjustments will be obvious to those of ordinary skill in the art having the benefit of this disclosure.

Accordingly, in one or more embodiments decision 1305 determines whether the companion electronic device has rotated relative to the wearable audio electronic device by a predefined rotation amount. Where decision 1305 is included, step 1306 comprises increasing the first sound volume from an initial volume level occurring when the companion electronic device is in the initial orientation to a second volume level after the orientation of the companion electronic device rotates from the initial orientation by a first rotation amount.

The process can then repeat as the companion electronic device continues to rotate, with another iteration resulting in the second volume level being increased to a third volume level when the orientation of the companion electronic device rotates from the initial orientation by a second rotation amount that is greater than the first rotation amount. Another iteration would result in the third volume level being increased to a fourth volume level when the orientation of the companion electronic device rotates from the initial orientation by a third rotation amount that is greater than the third orientation amount, and so forth.

Figures 17, 18:
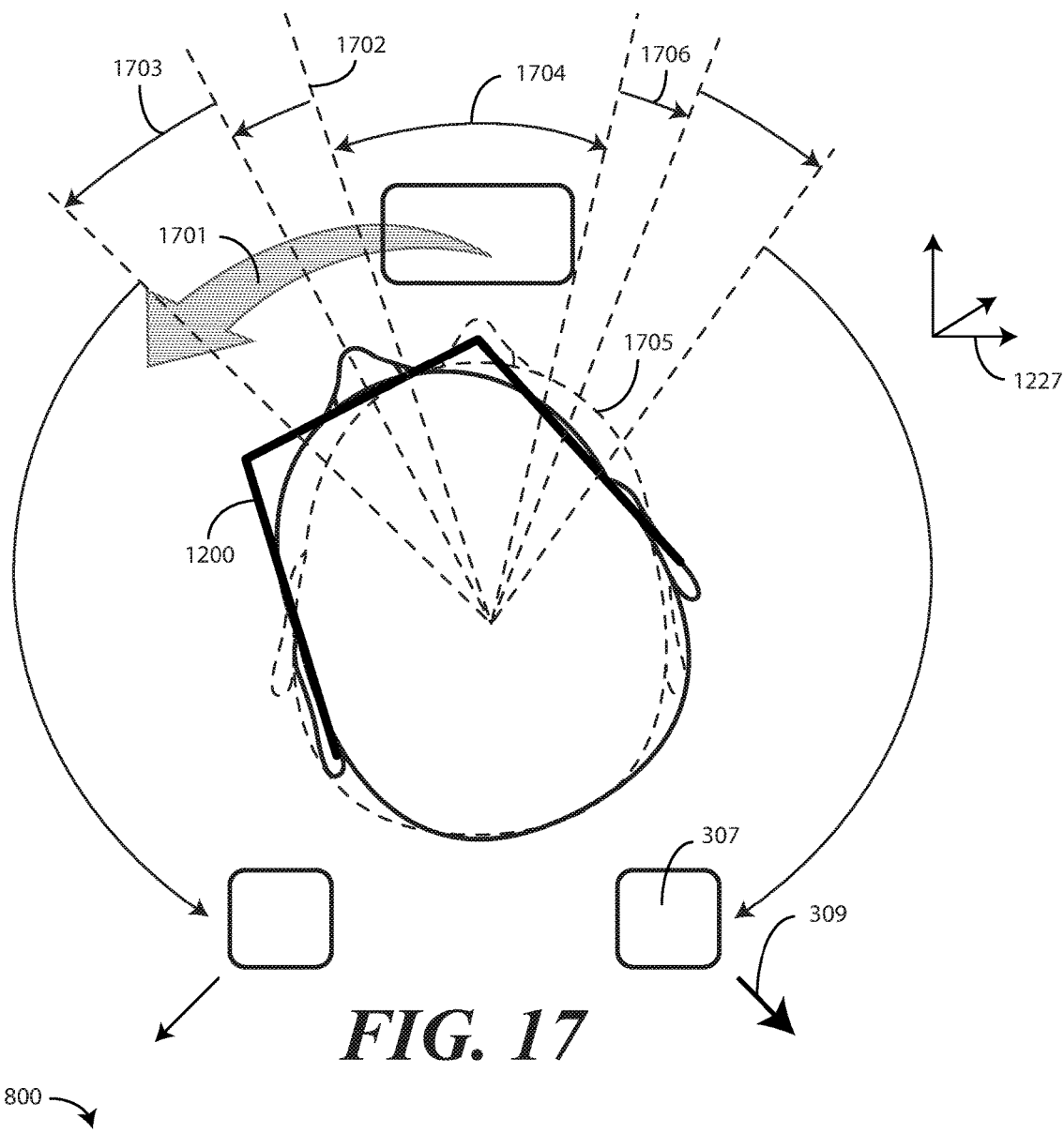
FIG. 17 illustrates one explanatory system in accordance with one or more embodiments of the disclosure.
FIG. 18 illustrates one explanatory delay compensation table in accordance with one or more embodiments of the disclosure.

Optional step 1307 performs additional steps to optimize the delivery of the full audio spectrum to the user. For example, step 1307 can include introducing one or more time delays to ensure that audio signals emanating from the first audio port and second audio port reach the user's ears at the same time. As one ear moves closer to an audio port and another moves further from the other audio port, the distances between the audio ports and the ears change. Table 1800 of FIG. 18 shows how, for a particular amount of rotation, the change in distance will affect the amount of time it takes sound to reach the ear. As shown in this table 1800, the change in timing is small. As such, the insertion of delays is optional. However, for optimal acoustic performance delays can be inserted at step 1307. Accordingly, in one or more embodiments step 1307 can comprise delaying audio signals emanating from an audio signal output when the signals from the companion electronic device indicate that the orientation of the companion electronic device has rotated relative to the wearable audio electronic device.

Step 1307 can also include introducing some hysteresis to prevent frequent step changes between volume levels. Illustrating by example, if the companion electronic device is wavering between nine and eleven degrees of rotation relative to the wearable audio electronic device when decision 1305 is included in the method 1300, it may become annoying to a user to hear the volume change back and forth. Accordingly, in one or more embodiments step 1307 introduced hysteresis to prevent such changes from occurring. This hysteresis might require that once a volume level has changed a predefined amount of rotation beyond the threshold be required for a change in the opposite direction, and so forth.

Figure 14:
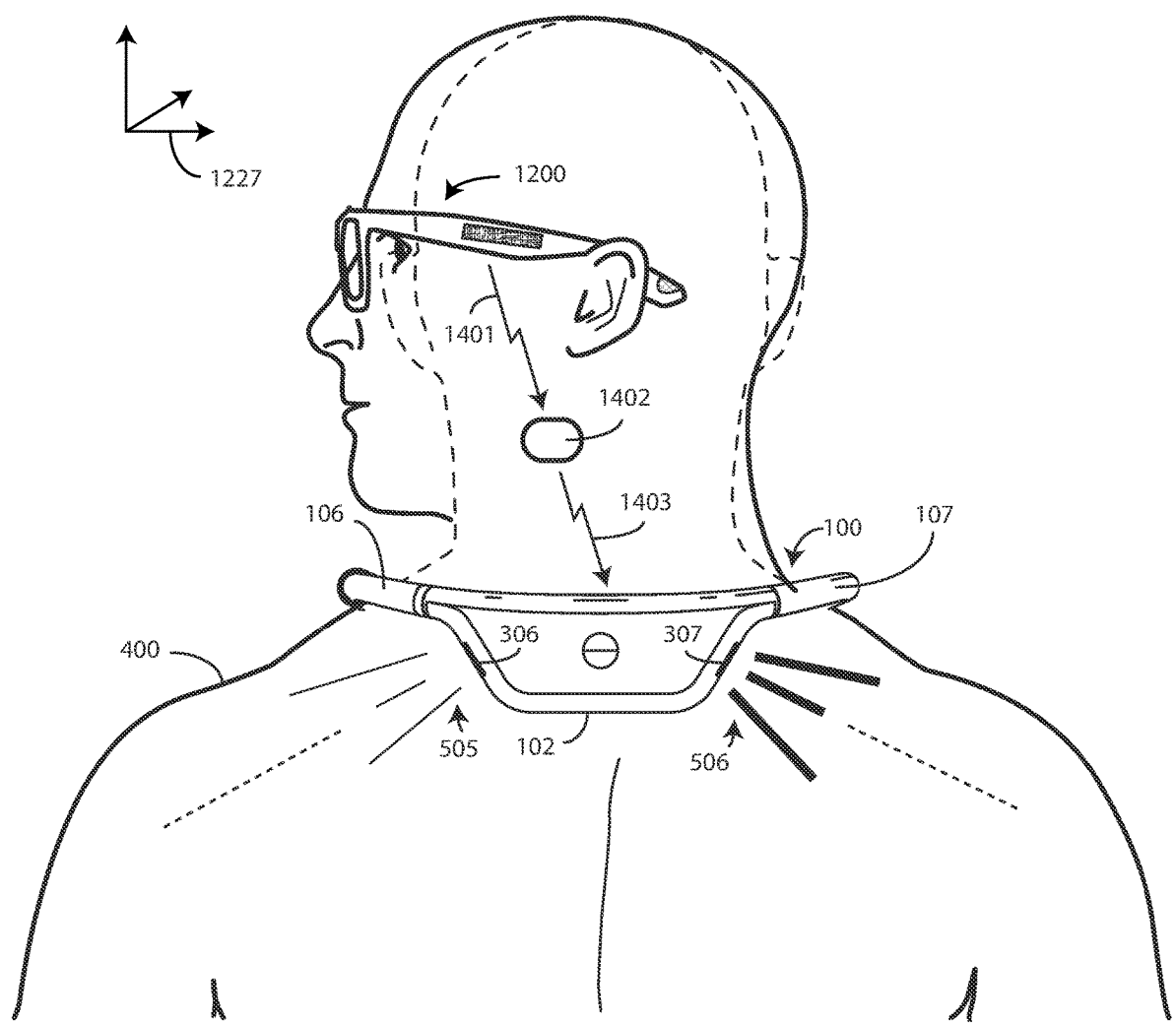
FIG. 14 illustrates one explanatory system in accordance with one or more embodiments of the disclosure.

FIG. 14 illustrates the method (1300) of FIG. 13 in operation when decision (1305) is omitted. As shown a user 400 is wearing both the wearable audio electronic device 100 of FIG. 1 and the augmented reality device 1200 of FIG. 12. The wearable audio electronic device 100 includes an anterior pendant (101), a posterior pendant 102, a left shoulder strap 106 coupling left sides of the anterior pendant (101) and the posterior pendant 102, and a right shoulder strap 107 coupling right sides of the anterior pendant (101) and the posterior pendant 102 together.

The wearable audio electronic device 100 includes a plurality of audio outputs. In one or more embodiments, a combined single left channel and right channel audio signal output is situated at a cranial edge of the anterior pendant (101). In one or more embodiments, a left channel audio signal output 505 is situated at a first end of the posterior pendant 102 while a right channel audio signal output 506 is situated at a second end of the posterior pendant 102.

As shown, the user 401 has turned their head to the left. One or more motion detectors situated in the augmented reality device 1200 determine that the orientation of the augmented reality device 1200 has changed from its initial position. A communication device in the augmented reality device 1200 then communicates 1401 an indication 1402 of the orientation of the augmented reality device 1200 in three-dimensional space 1227 to another communication device of the wearable audio electronic device 100. The communication device of the wearable audio electronic device receives signals 1403 from the augmented reality device 1200 indicating the orientation of the augmented reality device 1200 relative to the wearable audio electronic device 100.

One or more processors of the wearable audio electronic device 100 then cause the right channel audio signal output 309 emanating from the right channel audio signal output 506 to increase in volume when the signals 1403 from the augmented reality device 1200 indicate the orientation of the augmented reality device 1200 rotates to the left. Similarly, the one or more processors of the wearable audio electronic device 100 can cause the left channel audio signal output 308 emanating from the left channel audio signal output 505 to get quieter since the left ear moves toward the left channel audio signal output 505.

Figure 15:
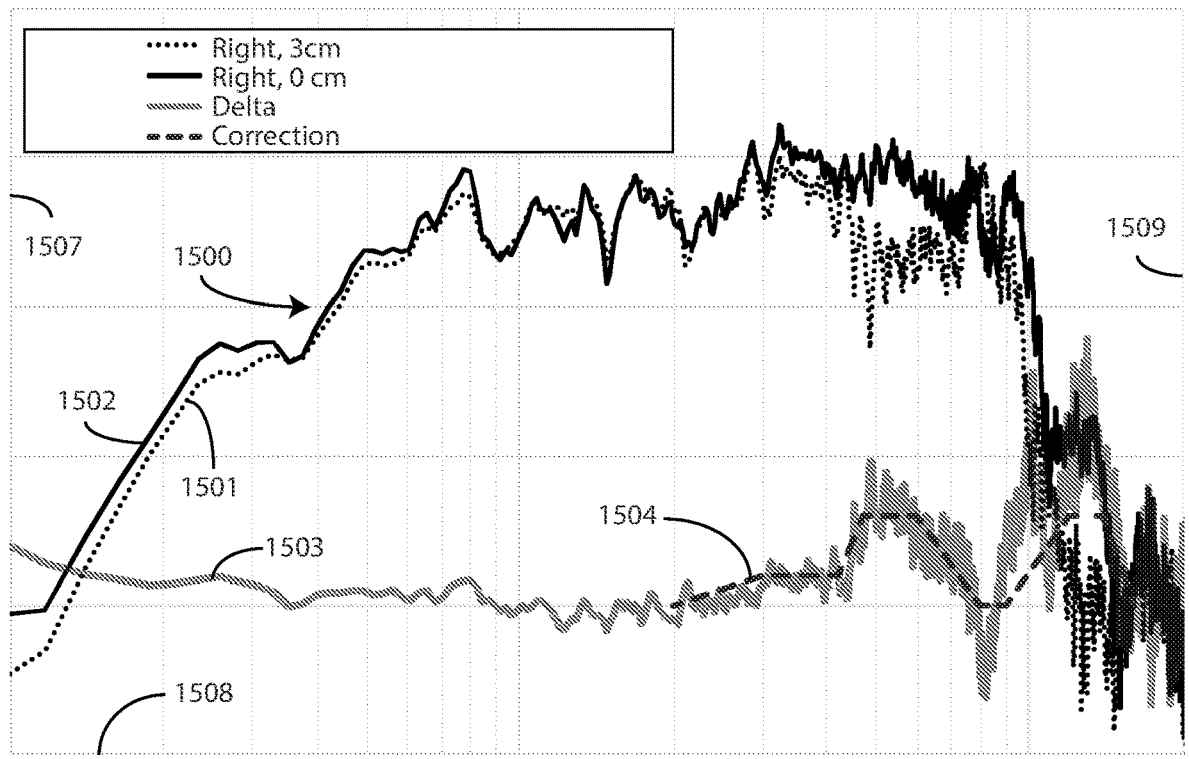
FIG. 15 illustrates one explanatory audio output after compensation for movement of a user's head in accordance with one or more embodiments of the disclosure.
Figure 16:
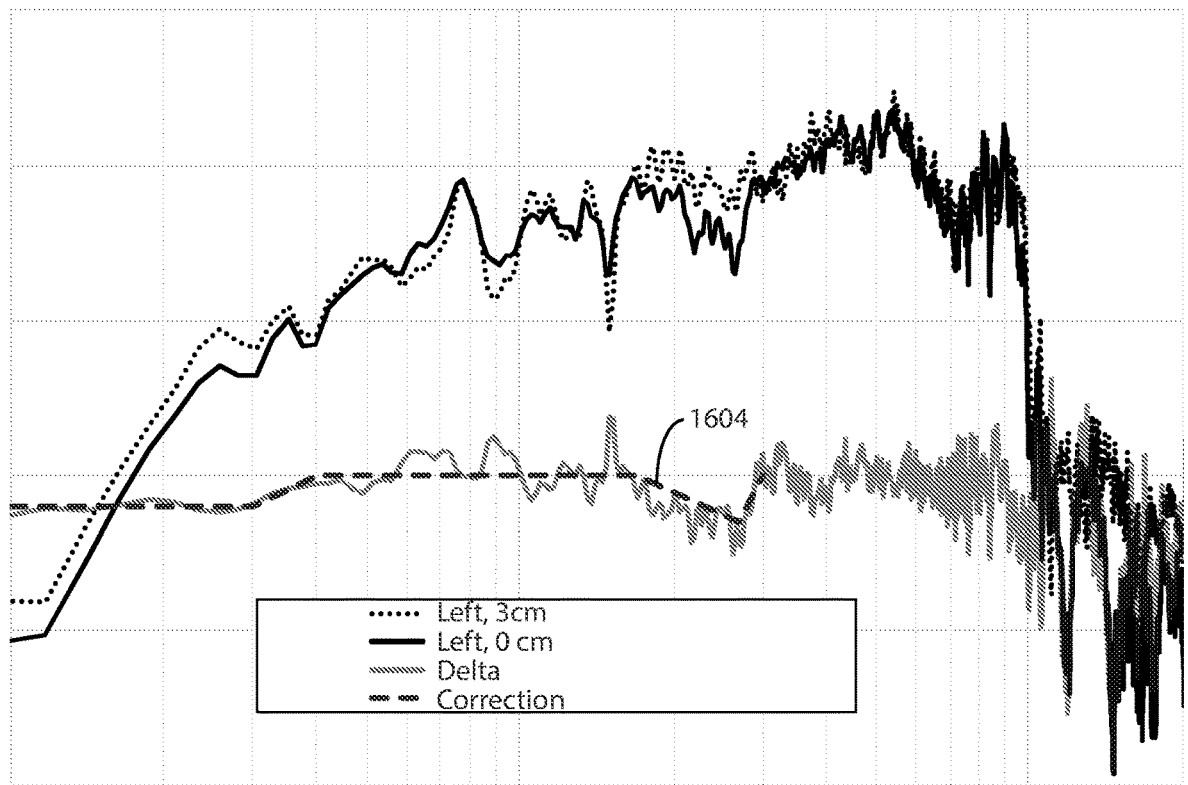
FIG. 16 illustrates another explanatory audio output after compensation for movement of a user's head in accordance with one or more embodiments of the disclosure.

FIGS. 15 and 16 illustrate explanatory corrections that can be applied. Beginning with FIG. 15, illustrated therein are two sound pressure level plots 1500 illustrating the audio loudness spectrum of the right channel audio signal output (506) and one explanatory correction that can be applied. Sound pressure level plot 1501 shows the volume when user (400) of FIG. 14 is looking straight ahead. Sound pressure level plot 1502 shows what the user (400) would hear without correction when turning their head by three centimeters. The vertical axis 1507 represents sound pressure level in decibels, ranging from 20 dB SPL to 70 dB SPL. The horizontal axis 1508 represents most of the audible spectrum, ranging from 100 Hertz to 20 kHz.

The right axis 1509 represents the amount of correction that is applied, and ranges from −10 dB to 40 dB. Sound pressure level plot 1503 shows the amount of correction applied for a three-centimeter rotation, with plot 1504 illustrating the increase in volume. As shown, a gain is applied with particular amplitude between 3500 Hertz and 5000 Hertz, and again between eleven and twelve kilohertz.

Turning now to FIG. 16, illustrated therein is the same graph for the left channel audio signal output (505). As shown by the gain plot 1604, the volume of frequencies between 2000 Hertz and 3000 Hertz is diminished, as are all frequencies below 300 Hertz.

Turning now to FIG. 17, illustrated therein is the operation of the method (1300) of FIG. 13 when decision (1305) is included. Here, volume changes are applied in a stepwise manner only after the user's head rotates by at least a predefined rotation amount, which is represented by one or more predefined rotation thresholds. Specifically, one or more processors of the wearable audio electronic device (100) cause the audio output of the posterior pendant (102) toward which an ear moves to increase in volume after the orientation of the augmented reality device 1200 in three-dimensional space (1227) changes in a first direction 1701 by more than a first predefined rotation threshold 1702. Thereafter, the one or more processors of the wearable audio electronic device (100) can cause the audio output of the posterior pendant (102) toward which the ear moves to again increase in volume after the orientation of the augmented reality device 1200 changes in the first direction by more than a second predetermined rotation threshold 1703 that is greater than the first predefined rotation threshold 1702, and so forth. The spaces between these thresholds represent rotation ranges from the initial orientation.

Accordingly, FIG. 17 illustrates a situation in which the one or more processors of the wearable audio electronic device (100) causing at least a portion of the right channel audio signal output 309 having frequencies between one kilohertz and ten kilohertz, inclusive, to have an initial volume when the signals (1403) from the augmented reality device 1200 indicate the orientation of the augmented reality device 1200 is within a first rotation range 1704 of an initial orientation 1705. In one or more embodiments, this causes the right channel audio signal output 309 emanating from the right channel audio signal output 506 to increase in volume when the signals (1403) from the augmented reality device 1200 indicate the orientation of the companion electronic device rotates to the left.

FIG. 17 also demonstrates that the one or more processors of the wearable audio electronic device (100) can causing the portion of the right channel audio signal output 309 to change from the initial volume to a second volume after signals (1403) from the augmented reality device 1200 indicate the orientation of the augmented reality device 1200 rotates beyond the first rotation range 1704 from the initial orientation. In one or more embodiments, this causes the portion of the right channel audio signal output 309 to change from the second volume to a third volume after the signals (1403) from the augmented reality device 1200 indicate the orientation of the augmented reality device 1200 rotates beyond a second rotation range 1706 from the initial orientation 1705 that is greater than the first rotation range 1704, and so forth. Rotation in the opposite direction would cause the opposite result.

Figure 19:
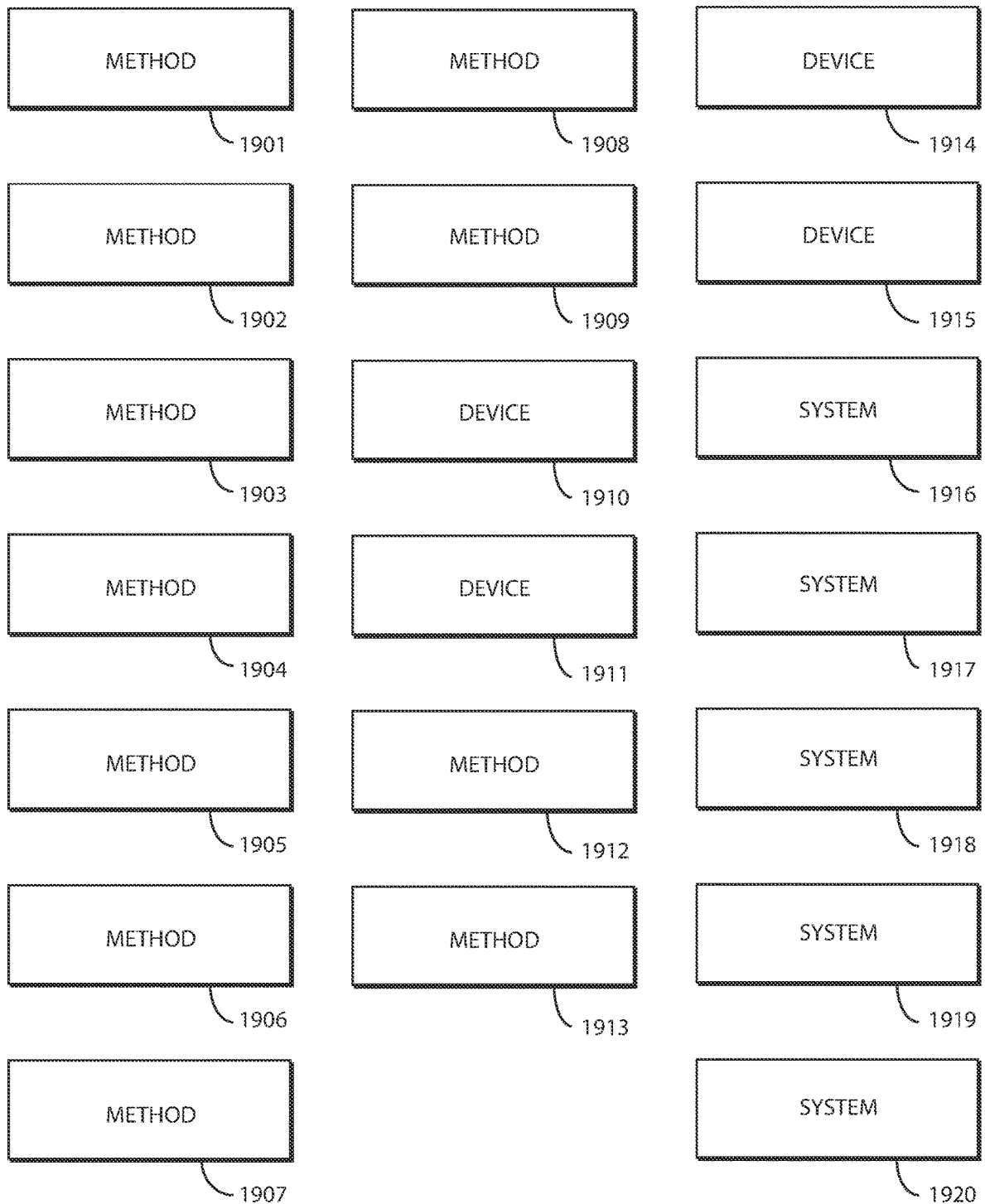
FIG. 19 illustrates various embodiments of the disclosure.

Turning now to FIG. 19, illustrated therein are various embodiments of the disclosure. The embodiments of FIG. 19 are shown as labeled boxes in FIG. 19 due to the fact that the individual components of these embodiments have been illustrated in detail in FIGS. 1-18, which precede FIG. 19. Accordingly, since these items have previously been illustrated and described, their repeated illustration is no longer essential for a proper understanding of these embodiments. Thus, the embodiments are shown as labeled boxes.

Beginning at 1901, a system comprises a first electronic device in communication with a second electronic device. At 1901, the first electronic device comprises one or more motion detectors determining an orientation of the first electronic device in three-dimensional space and a first communication device communicating an indication of the orientation of the first electronic device in the three-dimensional space to the second electronic device.

At 1901, the second electronic device comprises at least a first audio output and a second audio output delivering audio signals to an environment of the second electronic device. At 1901, the second electronic device comprises a second communication device receiving the indication of the orientation of the first electronic device in the three-dimensional space.

At 1901, the second electronic device comprises one or more processors that are operable with the second communication device. At 1901, the one or more processors cause at least one of the first audio output and/or the second audio output to alter the audio signals when the orientation of the first electronic device in the three-dimensional space changes.

At 1902, the first electronic device and the second electronic device of 1901 are both wearable electronic devices. At 1902, the first electronic device and the second electronic device are physically separate electronic devices. At 1903, the first electronic device of 1902 comprises an eyewear device and the second electronic device comprising a neck encircling audio device.

At 1904, the one or more processors of 1902 cause at least one of the first audio output and/or the second audio output to alter the audio signals by increasing a first volume of at least a portion of a first audio signal emanating from the first audio output when the orientation of the first electronic device in the three-dimensional space changes in a first direction. At 1905, the one or more processors of 1904 cause the at least one of the first audio output and/or the second audio output to alter the audio signals by decreasing a second volume of at least a portion of a second audio signal emanating from the second audio output when the orientation of the first electronic device in the three-dimensional space changes in the first direction.

At 1906, the at least a portion of the first audio signal of 1905 has only frequencies above one kilohertz. At 1906, the at least a portion of the second audio signal has only frequencies below five kilohertz.

At 1907, the one or more processors of 1905 further cause the at least one of the first audio output and/or the second audio output to alter the audio signals by increasing a third volume of at least another portion of the second audio signal emanating from the second audio output when the orientation of the first electronic device in the three-dimensional space changes in a second direction that is opposite the first direction and decreasing a fourth volume of at least another portion of the first audio signal emanating from the first audio output when the orientation of the first electronic device in the three-dimensional space changes in the second direction.

At 1908, the increasing the first volume of the at least a portion of the first audio signal emanating from the first audio output of 1904 occurs after the orientation of the first electronic device in the three-dimensional space changes in the first direction by more than a first predetermined rotation threshold. At 1909, the one or more processors of 1908 further cause at least one of the first audio output and/or the second audio output to alter the audio signals by again increasing the first volume of the at least a portion of the first audio signal after the orientation of the first electronic device in the three-dimensional space changes in the first direction by more than a second predetermined rotation threshold that is greater than the first predetermined rotation threshold.

At 1910, the one or more processors of 1902 cause at least one of the first audio output and/or the second audio output to alter the audio signals by delaying at least a portion of a first audio signal emanating from the first audio output when the orientation of the first electronic device in the three-dimensional space changes in a first direction.

At 1911, the second electronic device of 1901 comprises an anterior pendant comprising an anterior audio output delivering a left channel audio signal and a right channel audio signal through one or more ports of the anterior pendant and a posterior pendant comprising the first audio output delivering a first audio signal through a first port of the posterior pendant and a second audio output delivering the second audio signal through a second port of the posterior pendant.

At 1912, a method in an electronic device comprises receiving signals from a companion electronic device indicating an orientation of the companion electronic device relative to the electronic device. At 1912, the electronic device and the companion electronic device are physically separate electronic devices.

At 1912, the method comprises increasing a first sound volume associated with first audio emanating from a first audio port when the orientation of the companion electronic device rotates in a first direction relative to the electronic device. At 1912, the method comprises increasing a second sound volume associated with second audio emanating from a second audio port when the orientation of the companion electronic device rotates in a second direction relative to the electronic device that is opposite the first direction.

At 1913, the method of 1912 further comprises, prior to receiving the signals from the companion electronic device indicating the orientation of the companion electronic device relative to the electronic device, performing a calibration process identifying an initial orientation of the companion electronic device relative to the first audio port and the second audio port of the electronic device.

At 1914, the increasing the first sound volume associated with the first audio emanating from the first audio port of 1913 when the orientation of the companion electronic device rotates in the first direction relative to the electronic device comprises increasing the first sound volume from an initial volume level occurring when the companion electronic device is in the initial orientation to a second volume level after the orientation of the companion electronic device rotates from the initial orientation by a first rotation amount. At 1914, the increasing the first sound volume associated with the first audio emanating from the first audio port of 1913 when the orientation of the companion electronic device rotates in the first direction relative to the electronic device comprises increasing the first sound volume from the second volume level to a third volume level when the orientation of the companion electronic device rotates from the initial orientation by a second rotation amount that is greater than the first rotation amount. At 1914, the increasing the first sound volume associated with the first audio emanating from the first audio port of 1913 when the orientation of the companion electronic device rotates in the first direction relative to the electronic device comprises increasing the first sound volume from the third volume level to a fourth volume level when the orientation of the companion electronic device rotates from the initial orientation by a third rotation amount that is greater than the second rotation amount.

At 1915, the increasing the first sound volume associated with first audio emanating from the first audio port of 1914 when the orientation of the companion electronic device rotates in the first direction relative to the electronic device leaves other sound volume associated with other audio emanating from the first audio port and having frequencies less than one kilohertz unchanged. At 1916, the method of 1912 further comprises confirming the orientation of the companion electronic device has changed by determining, from one or more orientation sensors of the electronic device, another orientation of the electronic device in three-dimensional space.

At 1917, an electronic device comprises an anterior pendant, a posterior pendant, a left shoulder strap coupling left sides of the anterior pendant and the posterior pendant together, and a right shoulder strap coupling right sides of the anterior pendant and the posterior pendant together. At 1917, the electronic device comprises a plurality of audio outputs.

At 1917, the plurality of audio outputs consists of a left channel audio signal output situated at a first end of the posterior pendant, a right channel audio signal output situated at a second end of the posterior pendant separated from the first end of the posterior pendant by a posterior pendant body, and a single combined left channel and right channel audio signal output situated at a cranial edge of the anterior pendant.

At 1917, the electronic device comprises a communication device receiving signals from a companion electronic device indicating an orientation of the companion electronic device relative to the electronic device. At 1917, the electronic device comprises one or more processors causing left channel audio signals emanating from the left channel audio signal output to increase in volume when the signals from the companion electronic device indicate the orientation of the companion electronic device rotates in a first direction.

At 1918, the one or more processors of 1917 cause right channel audio signals emanating from the right channel audio signal output to increase in volume when the signals from the companion electronic device indicate the orientation of the companion electronic device rotates in a second direction that is opposite the first direction. At 1919, the one or more processors of 1918 delay the right channel audio signals from emanating from the right channel audio signal output when the signals from the companion electronic device indicate the orientation of the companion electronic device rotates in the first direction.

At 1920, the one or more processors of 1918 cause a portion of the left channel audio signals having frequencies between one kilohertz and ten kilohertz, inclusive, to have an initial volume when the signals from the companion electronic device indicate the orientation of the companion electronic device is within a first rotation range of an initial orientation. At 1920. the causing the left channel audio signals emanating from the left channel audio signal output to increase in volume when the signals from the companion electronic device indicate the orientation of the companion electronic device rotates in a first direction comprises causing the portion of the left channel audio signals to change from the initial volume to a second volume after signals from the companion electronic device indicate the orientation of the companion electronic device rotates beyond the first rotation range from the initial orientation and causing the portion of the left channel audio signals to change from the second volume to a third volume after the signals from the companion electronic device indicate the orientation of the companion electronic device rotates beyond a second rotation range from the initial orientation that is greater than the first rotation range.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims.

Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

What is claimed is:

1. A system, comprising:
    a first electronic device in communication with a second electronic device;
    the first electronic device comprising:
        one or more motion detectors determining an orientation of the first electronic device in three-dimensional space; and
        a first communication device communicating an indication of the orientation of the first electronic device in the three-dimensional space to the second electronic device;
    the second electronic device comprising:
        at least a first audio output and a second audio output delivering audio signals to an environment of the second electronic device;
        a second communication device receiving the indication of the orientation of the first electronic device in the three-dimensional space; and
        one or more processors operable with the second communication device and causing at least one of the first audio output and/or the second audio output to alter the audio signals when the orientation of the first electronic device in the three-dimensional space changes by:
            increasing a first volume of at least a portion of a first audio signal emanating from the first audio output and having only frequencies above one kilohertz when the orientation of the first electronic device in the three-dimensional space changes in a first direction; and
            decreasing a second volume of at least a portion of a second audio signal emanating from the second audio output and having only frequencies below five kilohertz when the orientation of the first electronic device in the three-dimensional space changes in the first direction.

2. The system of claim 1, wherein:
the first electronic device and the second electronic device are both wearable electronic devices;
and the first electronic device and the second electronic device are physically separate electronic devices.

3. The system of claim 2, the first electronic device comprising an eyewear device and the second electronic device comprising a neck encircling audio device.

4. The system of claim 1, the one or more processors causing the at least one of the first audio output and/or the second audio output to alter the audio signals by increasing a second volume of at least a portion of the second audio signal emanating from the second audio output when the orientation of the first electronic device in the three-dimensional space changes in a second direction.

5. The system of claim 1, the one or more processors causing the at least one of the first audio output and/or the second audio output to alter the audio signals only when the orientation of the first electronic device in the three-dimensional space changes by at least a predefined threshold.

6. The system of claim 1, wherein the one or more processors cause frequencies of the audio signals below one kilohertz to remain unamplified when causing the at least one of the first audio output and/or the second audio output to alter the audio signals when the orientation of the first electronic device in the three-dimensional space changes.

7. The system of claim 1, the one or more processors further causing the at least one of the first audio output and/or the second audio output to alter the audio signals by:
increasing a third volume of at least another portion of the second audio signal emanating from the second audio output when the orientation of the first electronic device in the three-dimensional space changes in a second direction that is opposite the first direction; and
decreasing a fourth volume of at least another portion of the first audio signal emanating from the first audio output when the orientation of the first electronic device in the three-dimensional space changes in the second direction.

8. The system of claim 1, wherein the increasing the first volume of the at least a portion of the first audio signal emanating from the first audio output occurs after the orientation of the first electronic device in the three-dimensional space changes in the first direction by more than a first predetermined rotation threshold.

9. The system of claim 8, the one or more processors further causing the at least one of the first audio output and/or the second audio output to alter the audio signals by again increasing the first volume of the at least a portion of the first audio signal after the orientation of the first electronic device in the three-dimensional space changes in the first direction by more than a second predetermined rotation threshold that is greater than the first predetermined rotation threshold.

10. The system of claim 1, the one or more processors causing the at least one of the first audio output and/or the second audio output to alter the audio signals by delaying at least a portion of a first audio signal emanating from the first audio output when the orientation of the first electronic device in the three-dimensional space changes in a first direction.

11. The system of claim 1, wherein the second electronic device comprises:
an anterior pendant comprising an anterior audio output delivering a left channel audio signal and a right channel audio signal through one or more ports of the anterior pendant; and
a posterior pendant comprising the first audio output delivering a first audio signal through a first port of the posterior pendant and a second audio output delivering a second audio signal through a second port of the posterior pendant.

12. A method in an electronic device, the method comprising:
receiving signals from a companion electronic device indicating an orientation of the companion electronic device relative to the electronic device, wherein the electronic device and the companion electronic device are physically separate electronic devices;
increasing a first sound volume associated with first audio emanating from a first audio port when the orientation of the companion electronic device rotates in a first direction relative to the electronic device; and
increasing a second sound volume associated with second audio emanating from a second audio port when the orientation of the companion electronic device rotates in a second direction relative to the electronic device that is opposite the first direction;
wherein the increasing the first sound volume associated with first audio emanating from the first audio port when the orientation of the companion electronic device rotates in the first direction relative to the electronic device leaves other sound volume associated with other audio emanating from the first audio port and having frequencies less than one kilohertz unchanged.

13. The method of claim 12, further comprising, prior to receiving the signals from the companion electronic device indicating the orientation of the companion electronic device relative to the electronic device, performing a calibration process identifying an initial orientation of the companion electronic device relative to the first audio port and the second audio port of the electronic device.

14. The method of claim 13, wherein the increasing the first sound volume associated with first audio emanating from the first audio port when the orientation of the companion electronic device rotates in the first direction relative to the electronic device comprises:
increasing the first sound volume from an initial volume level occurring when the companion electronic device is in the initial orientation to a second volume level after the orientation of the companion electronic device rotates from the initial orientation by a first rotation amount;
increasing the first sound volume from the second volume level to a third volume level when the orientation of the companion electronic device rotates from the initial orientation by a second rotation amount that is greater than the first rotation amount; and
increasing the first sound volume from the third volume level to a fourth volume level when the orientation of the companion electronic device rotates from the initial orientation by a third rotation amount that is greater than the second rotation amount.

15. The method of claim 12, further comprising confirming the orientation of the companion electronic device has changed by determining, from one or more orientation sensors of the electronic device, another orientation of the electronic device in three-dimensional space.

16. An electronic device, comprising:
  an anterior pendant;
  a posterior pendant;
  a left shoulder strap coupling left sides of the anterior pendant and the posterior pendant together;
  a right shoulder strap coupling right sides of the anterior pendant and the posterior pendant together;
  a plurality of audio outputs, the plurality of audio outputs consisting of:
    a left channel audio signal output situated at a first end of the posterior pendant;
    a right channel audio signal output situated at a second end of the posterior pendant separated from the first end of the posterior pendant by a posterior pendant body; and
    a single combined left channel and right channel audio signal output situated at a cranial edge of the anterior pendant;
  a communication device receiving signals from a companion electronic device indicating an orientation of the companion electronic device relative to the electronic device; and
  one or more processors causing left channel audio signals emanating from the left channel audio signal output to increase in volume when the signals from the companion electronic device indicate the orientation of the companion electronic device rotates in a first direction.

17. The electronic device of claim 16, the one or more processors causing right channel audio signals emanating from the right channel audio signal output to increase in volume when the signals from the companion electronic device indicate the orientation of the companion electronic device rotates in a second direction that is opposite the first direction.

18. The electronic device of claim 17, the one or more processors delaying the right channel audio signals from emanating from the right channel audio signal output when the signals from the companion electronic device indicate the orientation of the companion electronic device rotates in the first direction.

19. The electronic device of claim 17, the one or more processors causing a portion of the left channel audio signals having frequencies between one kilohertz and ten kilohertz, inclusive, to have an initial volume when the signals from the companion electronic device indicate the orientation of the companion electronic device is within a first rotation range of an initial orientation, wherein the causing the left channel audio signals emanating from the left channel audio signal output to increase in volume when the signals from the companion electronic device indicate the orientation of the companion electronic device rotates in a first direction comprises:
  causing the portion of the left channel audio signals to change from the initial volume to a second volume after signals from the companion electronic device indicate the orientation of the companion electronic device rotates beyond the first rotation range from the initial orientation; and
  causing the portion of the left channel audio signals to change from the second volume to a third volume after the signals from the companion electronic device indicate the orientation of the companion electronic device rotates beyond a second rotation range from the initial orientation that is greater than the first rotation range.

* * * * *